(12) United States Patent
Choudhury

(10) Patent No.: US 7,936,694 B2
(45) Date of Patent: May 3, 2011

(54) SNIFFING-BASED NETWORK MONITORING

(75) Inventor: Jonmejoy Das Choudhury, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 420 days.

(21) Appl. No.: 11/729,864

(22) Filed: Mar. 30, 2007

(65) Prior Publication Data

US 2007/0230361 A1    Oct. 4, 2007

(30) Foreign Application Priority Data

Apr. 3, 2006    (IN) .............................. 609/CHE/2006

(51) Int. Cl.
*H04L 12/26*    (2006.01)
(52) U.S. Cl. ....................................................... 370/252
(58) Field of Classification Search .................. 370/252, 370/229, 235, 237, 241, 242, 244, 248, 250, 370/351, 389, 392; 709/224; 379/1.01, 27.01, 379/27.02, 27.03, 27.04, 32.01, 33; 726/1, 726/2, 3, 21, 22, 23, 25, 26
See application file for complete search history.

(56) References Cited

U.S. PATENT DOCUMENTS

| | | | | |
|---|---|---|---|---|
| 6,766,325 | B1 * | 7/2004 | Pasumansky et al. | 707/101 |
| 7,580,994 | B1 * | 8/2009 | Fiszman et al. | 709/223 |
| 2002/0051464 | A1 * | 5/2002 | Sin et al. | 370/466 |
| 2003/0128692 | A1 * | 7/2003 | Mitsumori et al. | 370/352 |
| 2003/0223381 | A1 * | 12/2003 | Schroderus | 370/285 |
| 2004/0024865 | A1 * | 2/2004 | Huang et al. | 709/224 |
| 2004/0114570 | A1 * | 6/2004 | Vikberg et al. | 370/351 |
| 2004/0181709 | A1 * | 9/2004 | Gibson et al. | 714/25 |
| 2004/0264433 | A1 * | 12/2004 | Melpignano | 370/349 |
| 2005/0068942 | A1 * | 3/2005 | Chu et al. | 370/352 |
| 2005/0094651 | A1 * | 5/2005 | Lutz et al. | 370/401 |

\* cited by examiner

*Primary Examiner* — Derrick W Ferris
*Assistant Examiner* — Omar Ghowrwal

(57) ABSTRACT

A method is provided of monitoring a packet-switched network via which real-time data is transmitted. Data packets containing real-time data are sniffed by a monitor subagent to monitor a quality-of-service parameter. A monitor agent is notified in response to a breach of the threshold of the quality-of-service parameter about the breach. A network node manager is notified about the breach, and a root cause analysis is performed.

15 Claims, 15 Drawing Sheets

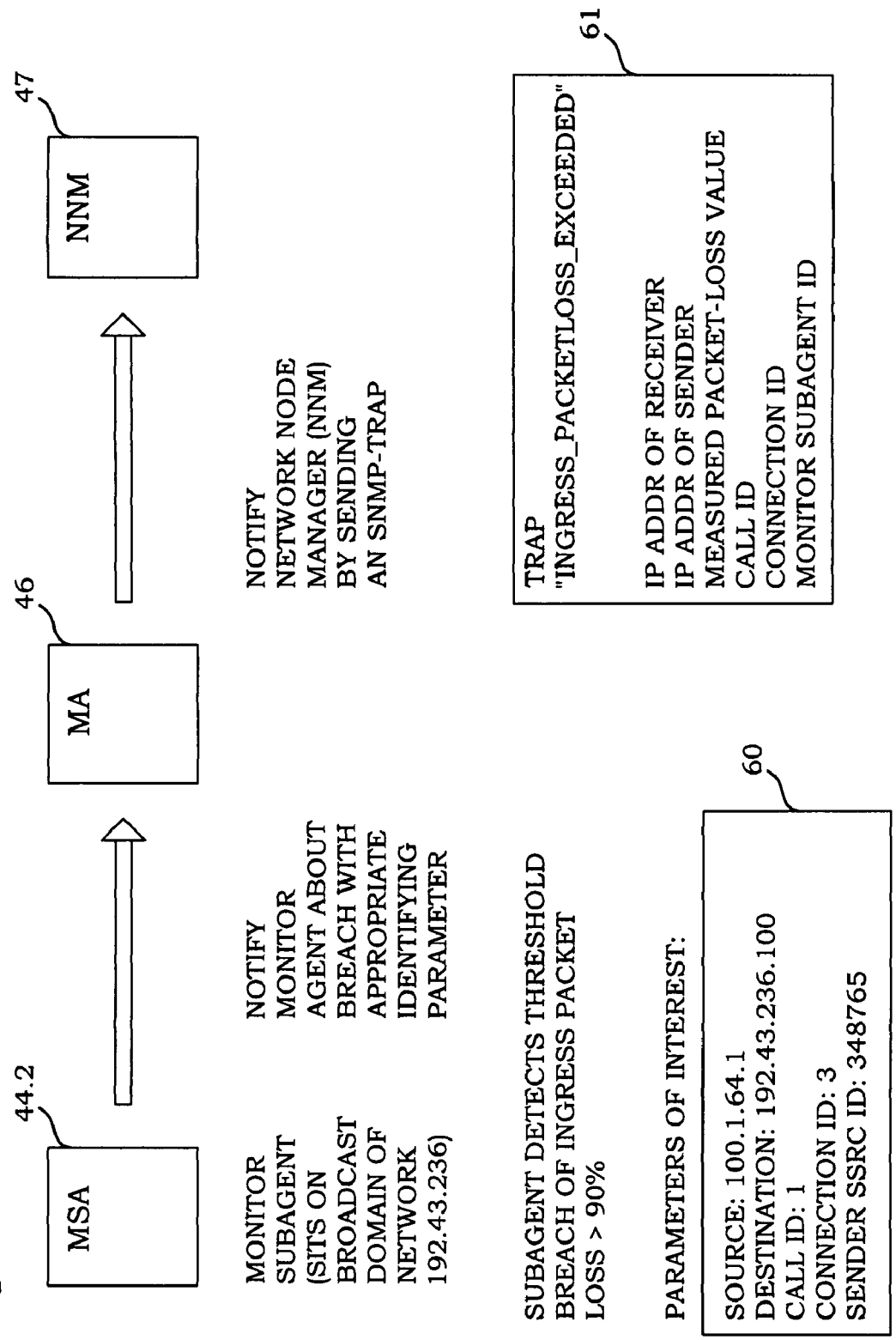

PERCEIVED AT SOURCE 15.76.115.163

RTP EXPECTED PACKETS AND PACKETS ACTUALLY RECEIVED

SNIFFING-BASED NETWORK MONITORING

BACKGROUND OF THE INVENTION

This application claims priority from Indian patent application 609/CHE/2006, filed on Apr. 3, 2006. The entire content of the aforementioned application is incorporated herein by reference.

With the number of users of Voice over IP (VoIP) systems on the increase, many service providers wish to give a warranty for the service they provide concerning transmission and fault performances to their customers. Furthermore, there is a need to derive a quantitative measure of the quality of the service delivered, to monitor the service and to investigate root causes of any faults occurring in a network. This will enable SLAs (service level agreements) for customers to be shaped, monitored and their violations compensated. The reason for doing this is to mitigate major market inhibitors for most VoIP deployments.

VoIP is a telephony application where the IP network facilitates packet data transport for discrete encoded samples of the voice, as well as signaling information exchanged between entities involved in this service. In order to obtain a good audio quality, it imposes strict real-time and network performance requirements that must be met by the IP network as closely as possible. This is especially important for the sessions set up for transmission of voice.

In the Internet world, however, since services are based on a network service model (=the services realized on the network layer), which is also referred to as "best effort model", no guarantees are provided concerning quality-of-service of transmission of data streams. The Internet protocol neither provides a bandwidth guarantee nor does it guarantee that the transmission is without any loss. Furthermore, data packets may arrive in any sequence at the destination, there is no guaranteed transmission time and no indication about congestion. In this respect, the Internet network service model differs, for example, from service network models provided in ATM (asynchronous transfer mode) networks. One network service model is, for example, a CBR service model. CBR (constant bite rate) enables a constant transmission rate and a loss-less transmission rate. The sequence of data packets is preserved and congestion does not occur. Further service network models are "variable bit rate (VBR)", "available bit rate (ABR)" and "unspecified bit rate (UBR)" which provide different quality-of-service which all provide higher quality than IP's "best effort" service model.

The evolution of Internet and ATM network service models also reflects their origins. With the concept of virtual channels (VCs) as a central organization principle, ATM cannot deny its origins from telephony (in which "real circuits" are used). A network based on virtual circuits is arguably more complex than a datagram network. (A datagram is a self-contained packet, one which contains enough information in the header to allow the network to forward it to the destination independently of previous or future datagrams. The terms "datagram" and "packet" are synonymously used herein.) In a datagram network, datagrams only carry their source and destination address and are sent from one router to another, whereby each router knows how to forward the datagrams. Telephone networks, by necessity, had their complexity within the network, since they were connecting dumb end-system devices such as rotary telephones.

The Internet as a datagram network, on the other hand, grew out of the need to connect computers together. Given more sophisticated end-system devices, the Internet architects chose to make the network-layer service model as simple as possible. Additional functionality, for example, in-order delivery, reliable data transfer, congestion control, and DNS name resolution is then implemented at a higher layer, in the end systems.

With regard to VoIP projects, this means that mechanisms for monitoring quality-of-service are established in order to enable a VoIP provider and/or a network provider to give a warranty for the service she/he provides to a client.

A warranty for a service is usually contractually agreed upon by means of an SLA. The TeleManagement Forum's SLA Management Handbook defines an SLA as "[a] formal negotiated agreement between two parties, sometimes called a service level guarantee. Typically, it is a contract (or part of one) that exists between the service provider and the customer, designed to create a common understanding about services, priorities, responsibilities, etc."

Historically, service level agreements arose in the early 1990s as a way of measuring and managing quality-of-service (QoS) that IT departments and service providers within private (usually corporate) computer networks delivered to their internal customers. To this end, network management tools have been developed, whereby many of the tools rely on the simple network management protocol (SNMP) which is part of the Internet protocol suite and is located on the application layer. SNMP is a client-server based management protocol in which a client queries variables which are stored in local databases, commonly referred to as management information bases (MIB), of the components to be monitored. It should be mentioned that the MIBs are at least partly configured by the manufacturer of the device; some manufacturers do not support MIBs.

SUMMARY OF THE INVENTION

A method is provided of monitoring a packet-switched network via which real-time data is transmitted. The method includes sniffing data packets containing real-time data by a monitor subagent to monitor a quality-of-service parameter, notifying, in response to a threshold breach of the quality-of-service parameter, a monitor agent about the breach, notifying a network node manager about the breach, and performing a root cause analysis.

BRIEF DESCRIPTION OF THE DRAWINGS

Embodiments of the invention will now be described, by way of example, and with reference to the accompanying drawings, in which:

FIG. 4a illustrates a cascaded way of forwarding information, upon detection of a threshold breach, from a monitor subagent to a monitor agent, and from the monitor agent to a network node manager, according to embodiments of the invention;

The drawings and the description of the drawings are of embodiments of the invention and not of the invention itself.

DESCRIPTION OF THE PREFERRED EMBODIMENTS

Figure 1A:
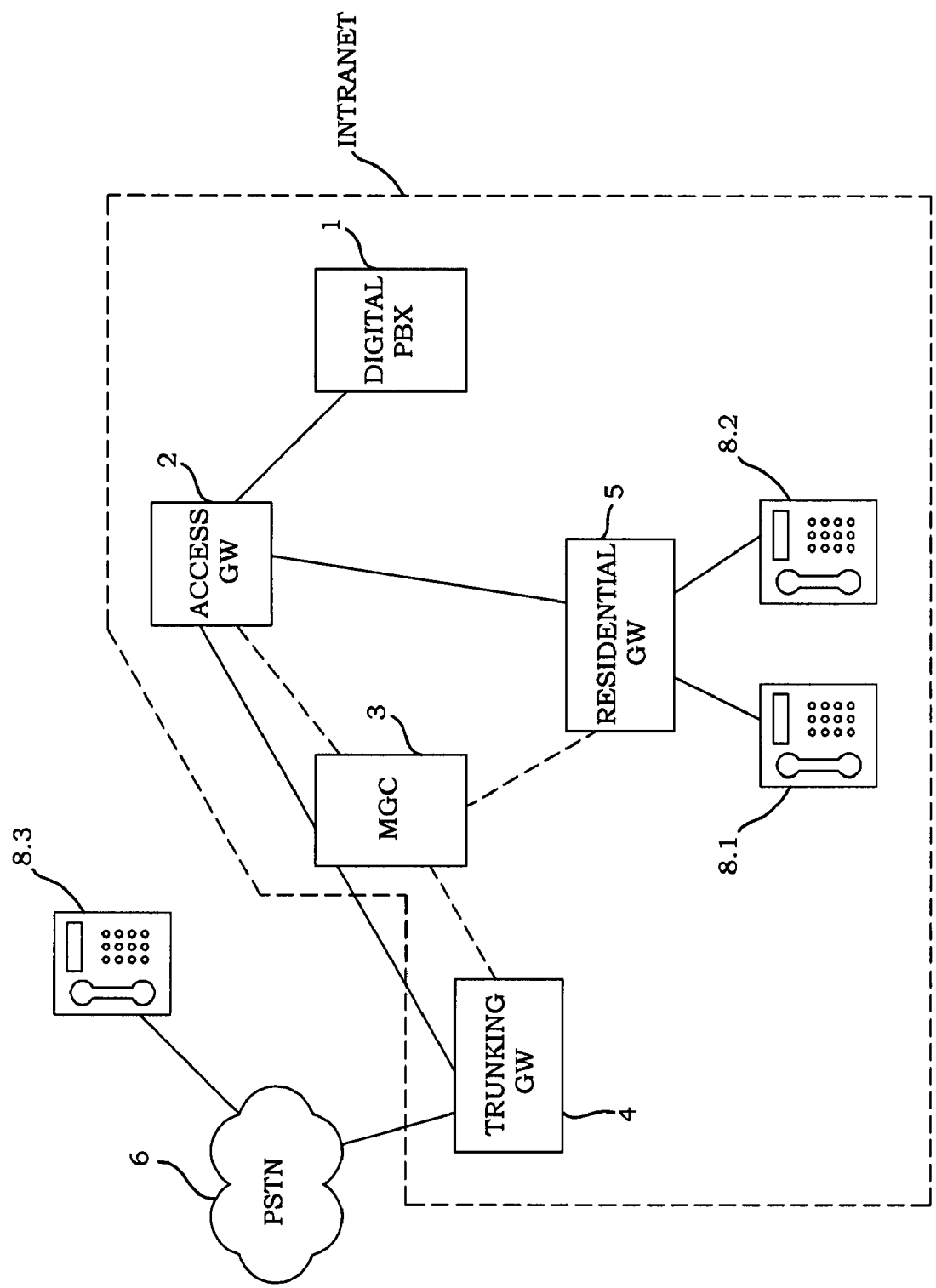
FIG. 1a shows a network architecture, in which a VoIP-call is made between an analog phone connected to a residential gateway and a telephone connected to a public switched telephone network, according to embodiments of the invention.

FIG. 1a shows an application scenario of a network architecture via which a VoIP-call is transmitted. However, before proceeding further with the description of FIG. 1a, a few items of the embodiments will be discussed.

In some of the embodiments, a packet-switched network is monitored via which real-time data is transmitted. Data packets containing real-time data are sniffed by a monitor subagent to monitor a quality-of-service parameter. A monitor agent is notified in response to a threshold breach of the quality-of-service parameter about the breach. Then, a network node manager is notified about the breach, and a root cause analysis is performed.

If a root cause has been detected, a report is sent to a user to inform her/him where the failure originates from. In some of the embodiments, the monitoring of the packet-switched network including a root cause analysis is performed to enable SLA management. Figuring out the root cause of faults occurring in a network may enable an operator to quickly remedy the fault and to enable a service provider to accomplish the fault.

In computer networks and telecommunications, packet switching is now the dominant communications paradigm in which packets (units of information carriage) are individually routed between nodes over data links which might be shared by many other nodes. This contrasts with the other principal paradigm, circuit switching, which sets up a dedicated connection between the two nodes for their exclusive use for the duration of the communication. Packet switching is used to optimize the use of the bandwidth available in a network, to minimize the transmission latency (i.e. the time it takes for data to pass across the network), and to increase the robustness of communication. In packet switching, a file is broken up into smaller groups of data known as packets. Such "packets" carry with them information with regard to their origin, destination and sequence within the original file. This sequence is needed for re-assembly at the file's destination.

In some of the embodiments, the real-time data transmitted over the packet-switched network is data pertaining to a VoIP service. VoIP refers to the routing of voice conversation over the Internet or any other IP-based network. The voice data flows over a general-purpose packet-switched network, instead of traditional dedicated circuit-switched voice transmission lines. VoIP is based on the real-time transport protocol (RTP) which has been designed for transmitting real-time interactive applications, including VoIP and video conferencing. In the ISO-OSI layer model, RTP is part of the application layer, although it is actually a transport protocol which should belong to the OSI-layer 4, the transport layer. Therefore, RTP is also referred to as a transport protocol implemented in the application layer. Via a socket interface, RTP is connected to the UDP (user datagram protocol) which also belongs to the transport layer but is below RTP. Therefore, the sending side encapsulates a media chunk within an RTP packet, then encapsulates the packet in a UDP packet, and then hands the packet to IP layer. The receiving side extracts the RTP packet from the UDP packet, extracts the media chunk from the RTP packet, and then passes the chunk to a media player for decoding and rendering. VoIP makes use of PCM encoding at 64 kbps. Further, it is supposed that the application collects the encoded data in 20 msec chunks, that is 160 bytes in a chunk. The sending side precedes each chunk of the audio data with an RTP header that includes the type of audio encoding, a sequence number, and a timestamp. The RTP header is normally 12 bytes. The audio chunk along with the RTP header form the RTP packet. The RTP packet is then sent into the UDP socket interface. At the receiver side, the application receives the RTP packet from its socket interface. The application extracts the audio chunk from the RTP packet and uses the header fields of the RTP packet to properly decode and play back the audio chunk. It should be mentioned that RTP does not provide any mechanism to ensure timely delivery of data or provide other quality-of-service (QoS) guarantees; it does not even guarantee delivery of packets or prevent out-of-order delivery of packets. RTP allows each source (for example, a camera or microphone) to be assigned its own independent RTP stream of packets. For example, for a video conference between two participants, four RTP streams could be opened—two streams for transmitting the audio (one in each direction) and two streams for transmitting the video (again, one in each direction). However, many popular encoding techniques—including MPEG1 and MPEG2—bundle the audio stream and video stream into a single stream during the encoding process. When the audio stream and video stream are bundled by the encoder, then only one RTP stream is generated in each direction.

RFC 1889 also specifies RTCP (RTP control protocol), a protocol that a networked multimedia application may use in conjunction with RTP. RTP packets are transmitted by each participant in an RTP session to all other participants in the session using IP multicast. For an RTP session, typically there is a single multicast address and all RTP and RTCP packets belonging to the session use the multicast address. RTP and RTCP packets are distinguished from each other by the use of distinct port numbers. (The RTCP port number is set to be equal to the RTP port number plus one.)

RTCP packets do not encapsulate chunks of audio or video. Instead, RTCP packets are sent periodically and contain sender and/or receiver reports that announce statistics that can be useful to the application. These statistics include the number of packets sent, the number of packets lost, and the interarrival jitter. The RTP specification [RFC 3550] does not dictate what the application should do with this feedback information; this is up to the application developer. Senders can use the feedback information, for example, to modify their transmission rates. The feedback information can also be used for diagnostic purposes; for example, receivers can determine whether problems are local, regional, or global.

For each RTP stream that a receiver receives as part of a session, the receiver generates a reception report. The receiver aggregates its reception reports into a single RTCP packet. The packet is then sent into a multicast tree that connects all the session's participants. The reception report includes several fields, the most important of which are listed below.

1. The SSRC (synchronization source identifier) of the RTP stream for which the reception port is being generated.

2. The fraction of packets lost within the RTP stream. Each receiver calculates the number of RTP packets lost divided by the number of RTP packets sent as part of the stream. If a sender receives reception reports indicating that the receivers are receiving only a small fraction of the sender's transmitted packets, it can switch to a lower encoding rate, with the aim of decreasing network congestion and improving the reception rate.

3. The last sequence number received in the stream of RTP packets.

4. The interarrival jitter, which is a smoothed estimate of the variation in interarrival time between successive packets in the RTP stream.

For each RTP stream that a sender is transmitting, the sender creates and transmits RTCP sender report packets. These packets include information about the RTP stream, including:

the SSRC of the RTP stream, the timestamp of the most recently generated RTP packet in the stream, the number of packets sent in the stream, and the number of bytes sent in the stream.

The User Datagram protocol (UDP), on which RTP is based, is one of the core protocols of the Internet protocol suite. Using UDP, programs on networked computers can send short messages known as datagrams to one another. UDP does not provide the reliability and ordering guarantees that TCP (Transmission Control Protocol) does; datagrams may arrive out of order or go missing without notice. However, as a result, UDP is faster and more efficient for many lightweight or time-sensitive purposes. Also its stateless nature is useful for servers that answer small queries from huge numbers of clients.

UDP is a minimal message-oriented transport layer protocol that is documented in RFC 768. In the TCP/IP model, UDP provides a very simple interface between a network layer below and an application layer above. UDP provides no guarantees for message delivery and a UDP sender retains no state on UDP messages once sent onto the network. Lacking reliability, UDP applications must generally be willing to accept some loss, errors or duplication. Some applications such as TFTP may add reliability mechanisms into the application layer as needed. Most often, UDP applications do not require reliability mechanisms and may even be hindered by them. If an application requires a high degree of reliability, a protocol such as the Transmission Control Protocol (TCP) or erasure codes may be used instead.

The term "sniffing" refers to a software or hardware entity that receives the data traffic of a network, records the data traffic and evaluates the data traffic afterwards. In other words, a sniffer is a tool for analyzing a local area network. Sniffing may be performed in promiscuous mode and non-promiscuous mode. In the non-promiscuous mode, only the data traffic of its own computer is controlled, whereas in promiscuous mode, the sniffer also "sees" the data traffic which is determined for another system. Furthermore, the data that can be seen by a sniffer depends on the network structure. If computers are used with hubs, then all the traffic can be seen by the other sniffers, since all computers belong to the same collision domain. If, however, a switch is used, then only little or no data traffic might be seen by the sniffer which is not determined for the system to be sniffed. All of the traffic in the designated Ethernet broadcast domain can be seen if the sniffer sniffs a mirror port that replicates all traffic seen across the ports of the switch in question. Most switch vendors provide support for mirror ports. However, configuring a mirror port is a performance penalty on the switch, unless there is dedicated hardware to accomplish mirroring. One example of a sniffer is "Ethereal" which uses Winpcap utilities to sniff and capture UDP packets and parses them for encapsulated RTP/RTCP packets.

The term "network node manager (NNM)" refers to a program or hardware entity that is able to monitor network nodes of a network. An example of a network node manager is Hewlett Packard's OpenView Network Node Manager (OV-NNM) having components, such as snmpCollect, ovwdb, topodb, an event subsystem, trap-to-event conversion and a path analysis subsystem, as will be explained below.

In some of the embodiments, the real-time data packets being sniffed are control packets that accompany the RTP payload. These control packets are the above-mentioned RTCP data packets which contain control information about the RTP data traffic.

In some of the embodiments, the quality-of-service parameter refers to end-to-end egress delay and ingress delay which give a quantitative measure of total latency in signal transmission which is propagation plus insertion plus other delays in each direction (one way delay). A delay value above a certain threshold will cause inability to comprehend peer user's response during a VoIP-call.

In other embodiments, the quality-of-service parameter refers to echo perceived by the VoIP user (roundtrip delay). A delay value above a certain threshold may cause the user to playback his own transmitted media. This delay manifests itself on a bad telephone line by the speaker's own voice being heard again (much like an echo).

In some of the embodiments, the quality-of-service parameter refers to jitter. A crucial component of end-to-end delay is the random queuing delays in the routers of a network. Because of these varying delays within the network, the time that elapses between a packet being generated at the source and its arrival at the receiver can fluctuate from packet to packet. This phenomenon is called jitter. As an example, let us consider two consecutive packets within a talk spurt in a VoIP application. The sender sends the second packet 20 msecs after sending the first packet. But at the receiver, the spacing between these packets may become greater than 20 msecs. To see this, suppose the first packet arrives at a nearly empty queue at a router, but just before the second packet arrives at the queue a large number of packets from other sources arrive at the same queue. Because the first packet suffers a small queuing delay and the second packet suffers a large queuing delay at this router, the first and second packets become spaced by more than 20 msecs. The spacing between consecutive packets can also become less than 20 msecs. To see this, again we can consider two consecutive packets within a talk spurt. It is assumed that the first packet joins the end of a queue with a large number of packets, and the second packet arrives at the queue before packets from other sources arrive at the queue. In this case, the two packets find themselves one right after the other in the queue. If the time it takes to transmit a packet on the router's outbound link is less than 20 msecs, then the first and second packets become spaced apart by less than 20 msecs. If the receiver ignores the presence of jitter and plays out chunks as soon as they arrive, then the resulting audio quality can easily become unintelligible at the receiver. Jitter may often be removed by using sequence numbers, timestamps, and a playout delay, as discussed below.

In some of the embodiments, the quality-of-service parameter refers to "throughput", which determines whether the network nodes are capable of meeting the high bandwidth requirement of various RTP transmissions. If throughput is exceeded, this usually translates into lost packets and is manifested as signal loss to the VoIP user. Conversely, a low throughput would indicate under-utilization or over-capacity of network nodes.

In other embodiments, the quality-of-service parameter refers to "instantaneous signal loss" which is perceived as sudden spurts of signal loss by the user and a corresponding signal-to-noise ratio. This phenomenon manifests itself when syllables in our speech are dropped, while using a non circuit-switched or wireless telephone line.

In some of the embodiments, the quality-of-service parameter refers to "accumulated content loss" which has billing and accounting implications. Users are provisioned for a certain throughput at a certain demanded bandwidth. Users are usually billed for the net content transferred or the bandwidth used. These computations will be governed by this metric.

In other embodiments, notifying a network node manager comprises sending a trap to the network node manager. In some of the embodiments, this trap is an SNMP trap which is generated by using the command "snmpnotify". The trap conveys information concerning the threshold breach to the network node manager where a root cause analysis is performed.

In some of the embodiments, performing a root cause analysis includes performing a path analysis to find out the path over which the real-time data is transmitted.

In other embodiments, the root cause analysis comprises examining interfaces of network nodes lying on the path found out. The term "interface" as used herein refers to the connections of a network node to other network nodes or parts of a network (subnet). A router, for example, has interfaces to all subnets to which it is connected.

In some of the embodiments, the root cause analysis is performed in cooperation with the monitor subagent which detected the threshold breach.

In other embodiments, an alarm is triggered in response to breaching a threshold. If a breach of a quality-of-service parameter is forwarded to a media gateway controller which triggers media gateways to renegotiate bandwidth of the communication, which may result in providing a higher bandwidth of a VoIP-call.

In some of the embodiments, sniffing is initiated by means of a media gateway controller, more particularly, the sniffing is initiated by signaling messages issued by the media gateway controller.

In other embodiments, the network node manager is coupled to a data warehouse which stores data concerning threshold breaches over a longer period of time and therefore enables a user to make statistical analysis concerning threshold breaches. A data warehouse may also provide an appropriate database for enabling a user to perform "what-if" analysis. In a "what-if" analysis, a user may provide network nodes and their performance data and determine the probability of a threshold breach under these specific circumstances.

Returning now to FIG. 1a, which shows a typical topology of a network running a VoIP service. It should be mentioned that the topology of the network is from a VoIP service perspective and does not detail actual IP network layer 2/3 topologies. FIG. 1a refers to a first of three cases, in which a call is set-up between an analog telephone 8.2 connected to an intranet and an analog telephone 8.3 connected to a public switched telephone network (PSTN) 6. In the example, a digital private branch exchange 1 (PBX) is shown which is a telephone exchange that is owned by a private business as opposed to one owned by a common carrier or by a telephone company. The PBX 1 has its own digital signaling and media protocol and formats. Using a PBX saves connecting all of a business's telephone sets separately to the public telephone network (PSTN or ISDN). Such a set-up would require every set to have its own line (usually with a monthly recurring line charge), and "internal" calls would have to be routed out of the building to a central switch, only to come back in again. As well as telephone sets, fax machines, modems and many other communication devices can be connected to a PBX (although the PBX may degrade line quality for modems).

In the example network shown in FIG. 1a, the digital private branch exchange (PBX) 1 is connected to an access gateway 2 which, in turn, is connected to a media gateway controller 3 which is further connected to a trunking gateway 4 and a residential gateway 5. Two analog telephones 8.1 and 8.2 are connected to the residential gateway 5. The media gateway controller 3 is responsible for setting up a call, i.e. is responsible for the signaling. A telephone call is established between analog telephone 8.2 and telephone 8.3. The access gateway 2 interfaces between the digital PBX 1 and the VoIP-network. The digital PBX 1 has its own telephone network, using TDM (time division multiplexing) signaling/media channels. The access gateway 2 performs mapping of these TDM channels to IP packets and vice versa. The media gateway controller 3 then sends/receives signaling messages proprietary to the PBX 1 via IP packets to/from the access gateway 2 since the telephone 8.2 (as an endpoint in the PBX's network) is involved in the VoIP-call. Similarly, once the call is set up, the access gateway 2 performs mapping of TDM to IP (and vice versa) media between the participating endpoints. The residential gateway 5 is a media gateway that primarily reconstructs analog signals from RTP media payload in IP packets to be fed to analog endpoints, digitizes and packetizes analog signals from endpoints to be carried in IP packets. Also, it is the "slave"-entity in VoIP signaling, as it generates appropriate analog signals to/from the endpoint in response to MGC's 3 signaling such as ringing tone, ringback tone, DTMF digit collection, off-hook/on-hook report, etc. and responds to call control requests such as that for the use of an agreed vocoder for VoIP media. The trunking gateway 4 refers to the interfacing entity between PSTN 6 and VoIP. PSTN's TDM channels are mapped to VoIP for signaling and media much like the access gateways described above. The VoIP interworking is also similar to that of access gateways.

In the example, a VoIP-call is set-up between an analog phone 8.2 behind a residential gateway 5 and a public switched telephone network user connected on a trunk interface on the trunking gateway 4. Network performance is monitored for transport of RTP/RTCP packets in the connections which are indicated as dotted lines and which are also referred to as media paths. Monitoring beyond the trunking gateway 4, i.e. in the public switched telephone network 6, is irrelevant since it is a circuit switched domain. Measurement beyond the residential gateway 5 along paths towards phone 8.2 is also irrelevant because it is an analog media connection. A path analysis in the presence of a network node manager's discovered topology data will yield the RTP/RTCP propagation paths. Throughput at each interface could give a measure of throughput of the VoIP media traffic in the presence of other traffic. A percentage utilization of these interfaces can also be arrived at. A user can visualize the network path used for the call set up and be able to pinpoint which interfaces cause the packet loss. If an end-to-end packet loss is reported, it can be correlated to the interfaces causing packet loss by looking up the analyzed path and consulting a network node manager topology database to resolve the associated interfaces. Thus, a root cause analysis is possible. If jitter or round trip delay threshold violations are detected, a user can be alerted via a network node manager event subsystem about the degradations. Also, these events can be forwarded to a subscribing media gateway controller 3, which uses the feedback to adapt to the changed network conditions and direct the media entities (in this case residential gateway 5 and trunking gateway 4 peers) to e.g. renegotiate a lower bandwidth communication. A user can profile the performance metric data collected to a data warehouse for trend analysis. A "what-if" analysis can be applied to that data by varying metric derived parameters to see how other metrics are affected. This is useful in capacity planning. For example, an increasing trend in throughput across certain interfaces at certain times of the day suggests that more capacity needs to be provisioned at that time of the day. Roundtrip delay values could indicate the efficacy of paths taken by the UDP packets carrying the RTP payload data. A user can devise SLA events based on the collected metrics and define corresponding accounting events to be forwarded to a billing system.

Figure 1B:
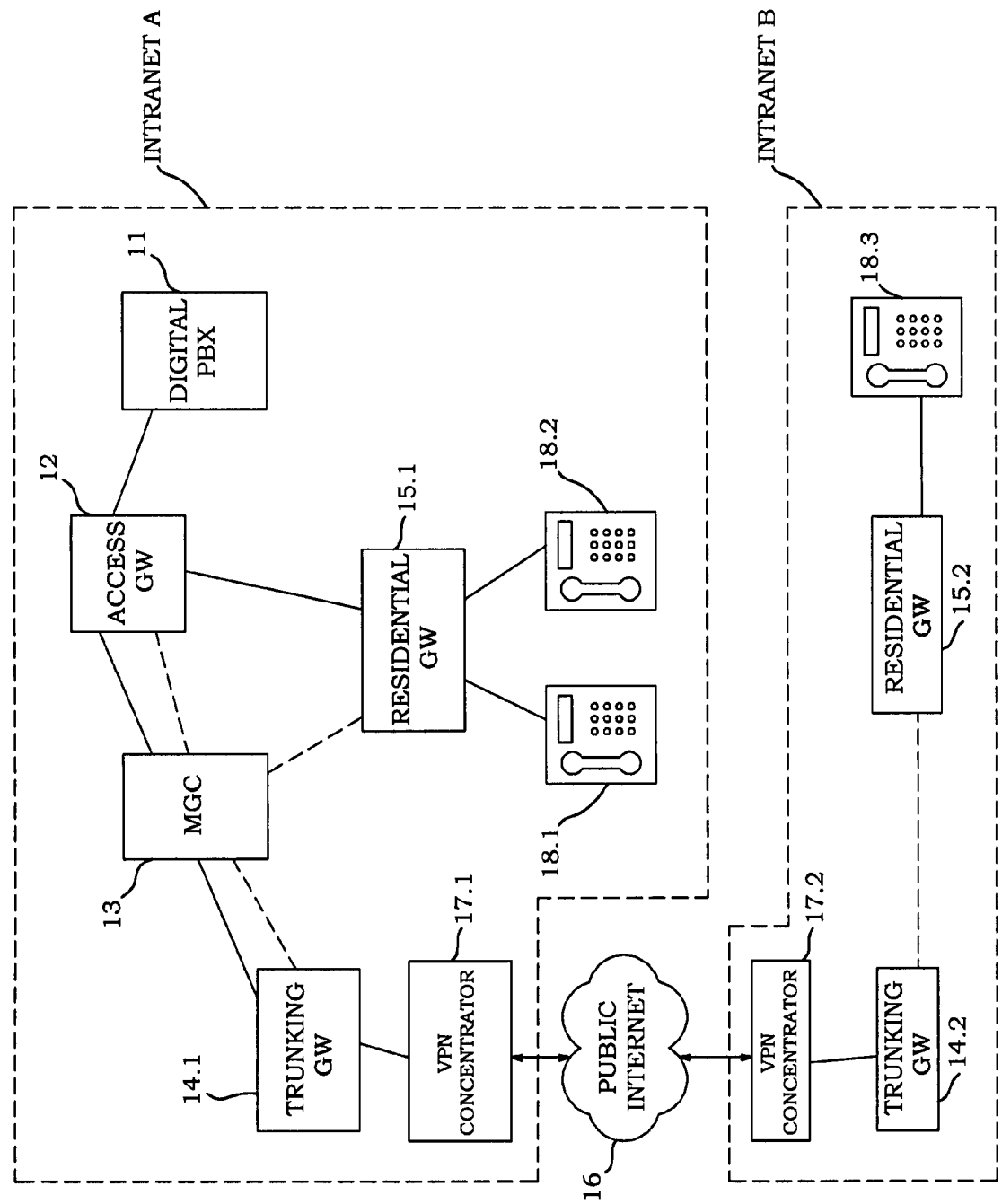
FIG. 1b illustrates a network architecture, in which a VoIP-call is made between an analog phone connected to a residential gateway of a first intranet and a telephone connected to a residential gateway of a second intranet, according to embodiments of the invention.

FIG. 1*b* refers to another application scenario in which a VoIP-call is set-up between intranet A and intranet B via the public Internet 16. Both intranet edge routers are configured to throw inter network RTP traffic to VPN (virtual private network) concentrators 17.1 and 17.2. A VoIP-call is set up between an analog phone behind a residential gateway 15.1 in intranet A and a peer entity in intranet B. All the aspects as discussed with reference to FIG. 1*a* are also applicable here. One difference, however, is that the path analysis will yield path(s) excluding the public Internet 16 connection on either of the intranet edges. Using the strategies as in FIG. 1*a*, the user can easily establish whether the intranets in question are responsible, should service degradation happen. This is illustrated further in the following points. For example, if packet loss is reported, the user can ascertain if the loss happens partly of wholly within the intranets. If it is identified that the public Internet 16 is the contributor to this anomaly, suitable action can be taken to mitigate that. For instance, if round-trip delay or excessive jitter is reported, it is easy to identify which parts of the link cause the latencies (residential gateway to edge of intranet A or edge of intranet B to other peer in intranet B). The media paths which are subject to performance monitoring are again indicated as dotted lines in the intranet A and B.

Figure 1C:
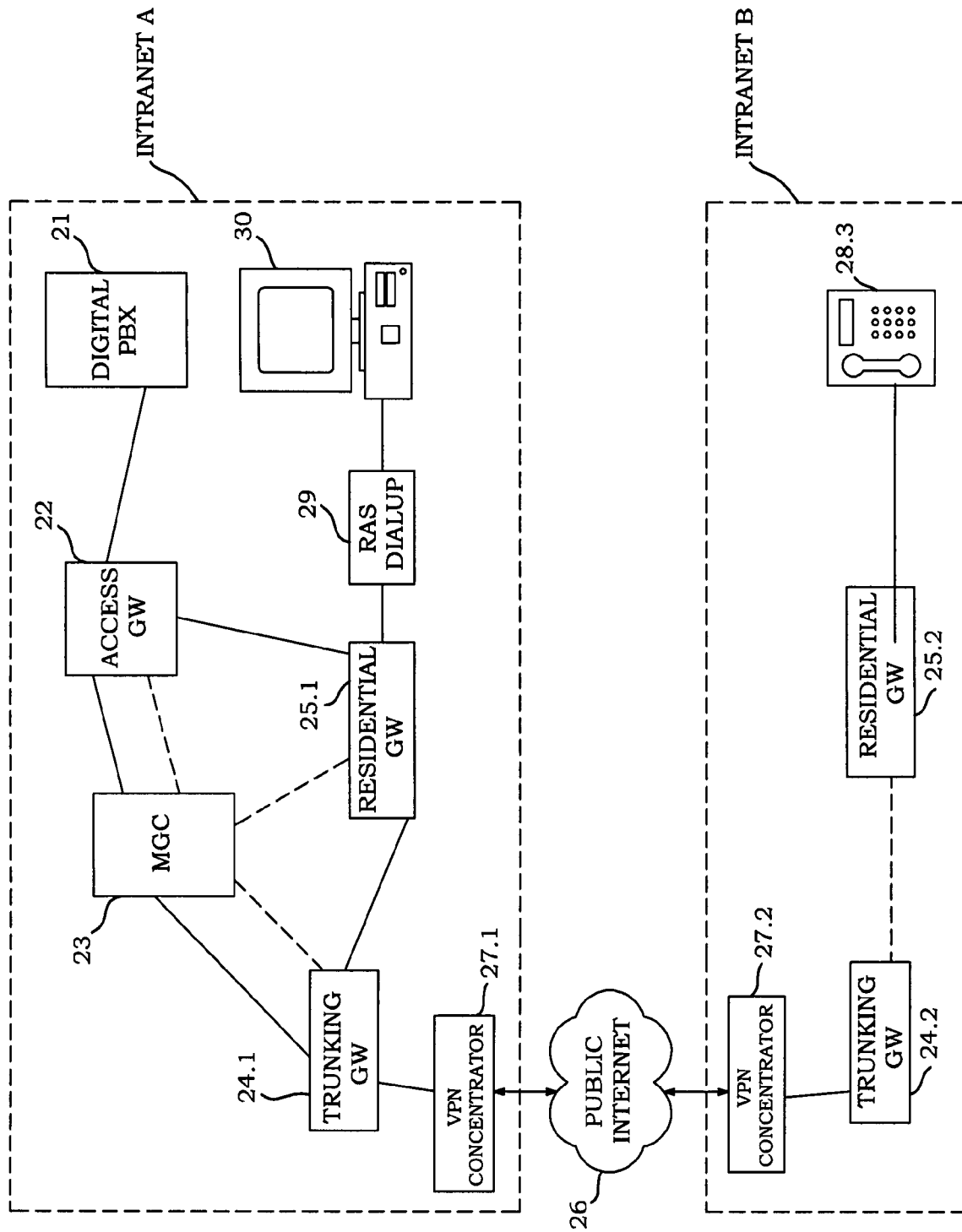
FIG. 1c shows a network architecture, in which a VoIP-call is made between a PC running Microsoft Netmeeting (a VoIP-based and multipoint videoconferencing client) in a first intranet and an analog phone connected to a residential gateway of a second intranet, according to embodiments of the invention.

FIG. 1*c* refers to a third application scenario in which a VoIP-call is set-up between a desktop PC 30 running Microsoft Netmeeting and an analog phone 28.3 connected to a residential gateway 25.2 of intranet B. The PC 30 is connected to a RAS dialup 29, which stands for Remote Access Services (RAS) and is a service provided by Windows NT which allows most of the services which would be available on a network to be accessed over a modem link. The service includes support for dialup and logon, and then presents the same network interface as the normal network drivers (albeit slightly slower). It is not necessary to run Windows NT on the client—there are client versions for other Windows operating systems. A feature is built into Windows NT that enables users to log into an NT-based LAN using a modem, X.25 connection or WAN link. RAS works with several major network protocols, including TCP/IP, IPX, and NetBEUI. To use RAS from a remote node, a RAS client program is needed, which is built into most versions of Windows, or any PPP client software. For example, most remote control programs work with RAS. The connections subject to network monitoring are again indicated as dotted lines.

Figure 2:
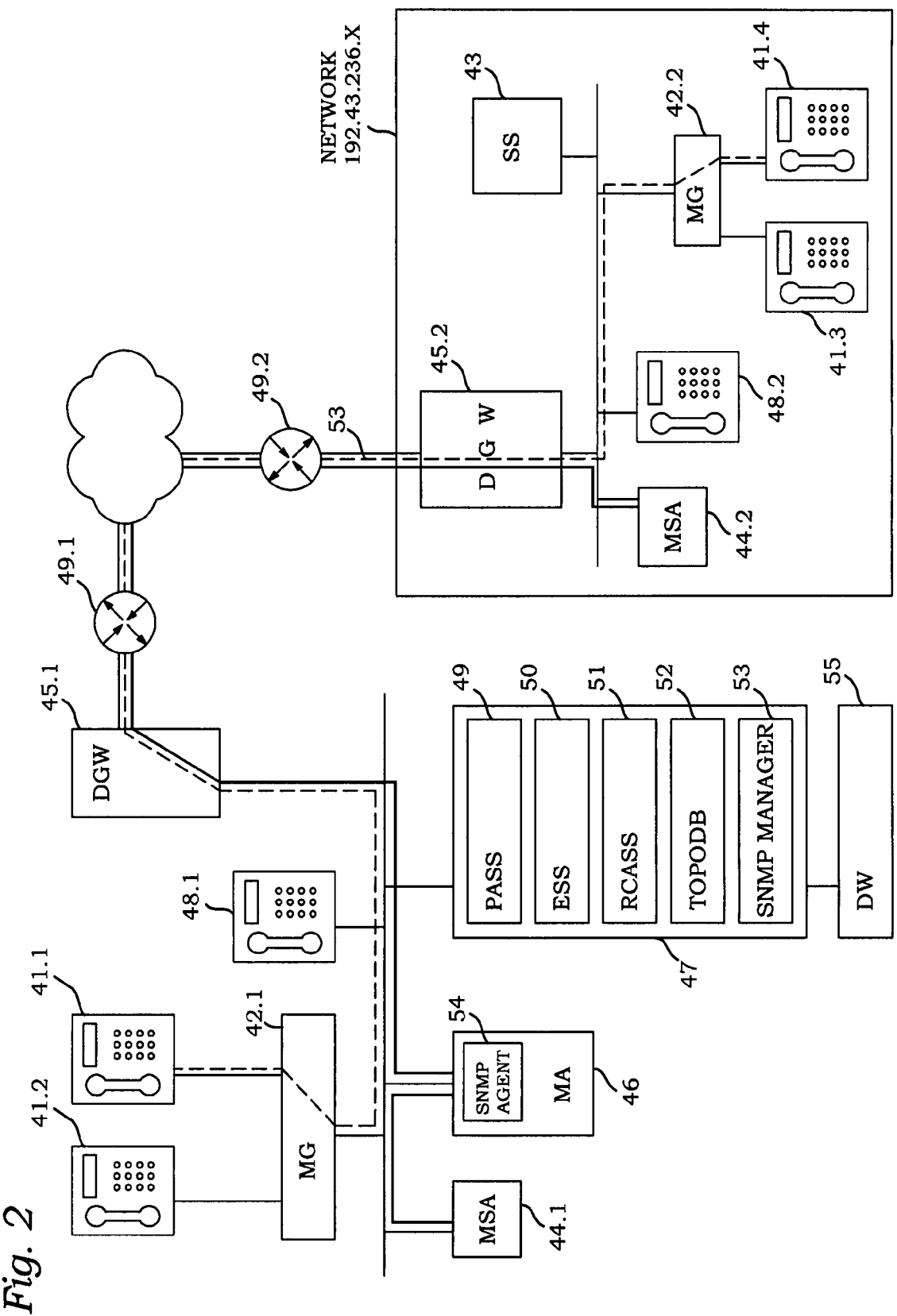
FIG. 2 shows a packet-switched network including a network node manager, via which a VoIP-call is performed, according to embodiments of the invention.

FIG. 2 depicts how a monitoring agent 46 and two sub-agents 44.1, 44.2 sit on the service topology and how the agent 46 and sub-agents 44.1, 44.2 may interact upon detection of a threshold breach. In the network, a telephone call is set up between two analog telephones 41.1 and 41.4. The data transmitted in this telephone call 53 is indicated as a dotted line. The analog voice signals are encoded via G.711 which is an ITU-T standard for audio companding. It is primarily used in telephony. G.711 is a standard to represent 8 bit compressed pulse code modulation (PCM) samples for signals of voice frequencies, sampled at the rate of 8000 samples/second. A G.711 encoder will create a 64 kbit/s bitstream. PCM is a digital representation of an analog signal where the magnitude of the signal is sampled regularly at uniform intervals, then quantized to a series of symbols in a digital (usually binary) code. PCM is used in digital telephone systems and is also the standard form for digital audio in computers.

The analog phones 41 are connected to the network via a media gateway 42 which acts as a translation unit between disparate telecommunication networks such as PSTN (public switched telephone network) and the IP-based Internet. Media gateways 42 enable multimedia communications across next generation networks over multiple transport protocols such as ATM and IP. The media gateway 42 is controlled by a softswitch 43 which provides the call control and signaling functionality.

It should be mentioned that the terms "softswitch" and "media gateway controller" are similarly used; however, there is a difference in functionality. If a VoIP master/slave signaling protocol is in use for both endpoints, such as MGCP (media gateway control protocol), in that case the MGC will have to drive the signaling for phones sitting behind a media gateway, e.g. a residential gateway or an access gateway in FIGS. 1*a-c*. This is in addition to the call routing, directory lookup, ITU-T Class 5 feature switching, etc. performed by a softswitch. In that case, the terms "softswitch" and "media gateway controller" may be used interchangeably. In situations where a peer-to-peer signaling is used by both endpoints, such as SIP, a media gateway controller is not required, so that only softswitch functionality is relevant. In a scenario where one endpoint uses master/slave protocol but the other uses peer-to-peer (e.g. H.323 by Microsoft NetMeeting), a media gateway controller is required to drive the master/slave side. The softswitch will do the signaling protocol conversion to support both endpoints. In this case the media gateway controller and softswitch may be separate physical entities or separate logical entities co-located on the same physical node.

Communication between media gateways and softswitches is achieved by means of protocols such as the MGCP mentioned above. Media gateways 42.1 and 42.2 perform the conversion from TDM (time division multiplexing) voice to VoIP.

The network shown in FIG. 2 also provides a softswitch 43 which is a central device in a telephone network which connects calls from one phone line to another, entirely by means of software running on a computer system. This was formerly carried out by hardware, with physical switchboards to route the calls. The softswitch 43 is used to control connections at the junction point between circuit-switched and packet-switched networks. The softswitch 43 controls the media gateways 42.1 and 42.2. The softswitch 43 receives signaling information (like dialed digits) from the media gateways 42.1 and 42.2 and can instruct it to alert the called party, to send and receive voice data etc. There are several protocols which can be used between the softswitch 43 and the media gateways 42.1 and 42.2: SGCP, IPDC, MGCP and Megaco which is also known as H.248. Some softswitches can interface with other signaling protocols, like SS7 (for interconnection with the traditional telephone system), H.323 and SIP. The network shown can also be referred to as a softswitch architecture. The advantages of the softswitch architecture are that the media gateways 42.1 and 42.2 are easy to maintain and that the softswitch operator retains full control; the disadvantage is that softswitch architectures tend to be inflexible.

The network shown in FIG. 2 further provides two monitor subagents 44.1 and 44.2 which are on the same broadcast domain as the media gateways 42.1 and 42.2 which connect the analog telephones 41.1, 41.2 and 41.3, 41.4. After a telephone call has been set up between the analog telephones 41.1 and 41.4, the monitor subagents 44.1 and 44.2 sniff the incoming data packets transporting the voice data. To this end, the monitor subagents 44.1 and 44.2 sniff the UDP data packets and search for RTP and RTCP packets. In the example, monitor subagent 44.2 detects a threshold breach of ingress packet loss greater than 90% and sends a notification to a monitor agent 46 which, in turn, sends an SNMP-trap to a network node manager 47. The communication between the monitoring subagent 44.2 and monitoring agent 46 may also be performed on an SNMP-basis with respect to uniformity and encoding of a large number of parameters in a single message. Other proprietary messaging using TCP/UDP could also be used if the interface between sub-agent and monitor agent is not a public one. The network node manager 47 is equipped with a path analysis subsystem 49 which is capable of figuring out a path via which RTP data is transmitted and therefore in combination with the root cause analysis subsystem 51, enables the root cause of a fault to be determined. Furthermore, a topology database 52 is provided which enables the topology of the network to be determined. All data provided by the network node manager 47 is provided to a data warehouse 55 where the data is stored for a longer period of time and which enables a long-term analysis of the fault data. Furthermore, the network is equipped with two default gateways 45.1 and 45.2 which connect the LAN with another packet-switched network. This network includes routers 49, router 49.1 and router 49.2.

Furthermore, it should be noted that two IP phones 48.1 and 48.2 are provided in the network. These IP phones need not be connected to the network via the media gateways 42.1 and 42.2 since they are enabled to send and receive IP packets directly.

After the telephone call 53 has been set up, monitor subagent 44.2 is triggered by the softswitch 43 to check the data traffic on its broadcast domain. The monitor subagent 44.2 may be considered as a plug-in module that is resident in an intermediate node in the network path of the RTP packets. This node is able to capture UDP packets carrying RTP payload and pass them upwards to the plug-in module. The monitor subagent 44.2 is a node that is able to sniff Ethernet frames promiscuously in an appropriate Ethernet broadcast domain. The monitor subagent 44.2 is configured with threshold values for various quality-of-service parameters that are collected and measured. The monitor subagent 44.2 is able to communicate with the network node manager 47 to send notifications if thresholds are breached. The monitor subagent 44.2 accepts commands, by the softswitch 43, to start and stop sniffing the network traffic so that there is no unnecessary sniffing in the absence of RTP traffic. The monitor subagent 44.2 may follow signaling messages issued by the softswitch 43 and infer when and which peers to monitor for RTP traffic. In the example, the monitor subagent 44.2 detects that incoming packets are less than outgoing packets. This ingress packet loss may be determined by means of the RTCP packets sniffed by the monitor subagent 44.2 in the broadcast domain. The RTCP packet contains a reception report which indicates the number of RTP packets lost divided by the number of RTP packets sent as part of the stream. The monitor subagent 44.2 compares the ingress packet loss with a threshold which has been defined by a user. The threshold breach is then reported to the monitor agent 46, which in turn sends an SNMP-trap to the network node manager (NNM) 47. A trap is an unsolicited report about an event which is sent from an SNMP agent 54 resident on the monitor agent 46 to the SNMP-manager 53 resident on the network node manager 47. If the SNMP-manager 53 on the network node manager 47 receives a trap, the path analysis subsystem 49 on the network node manager 47 triggers a root cause analysis.

Figure 3A:
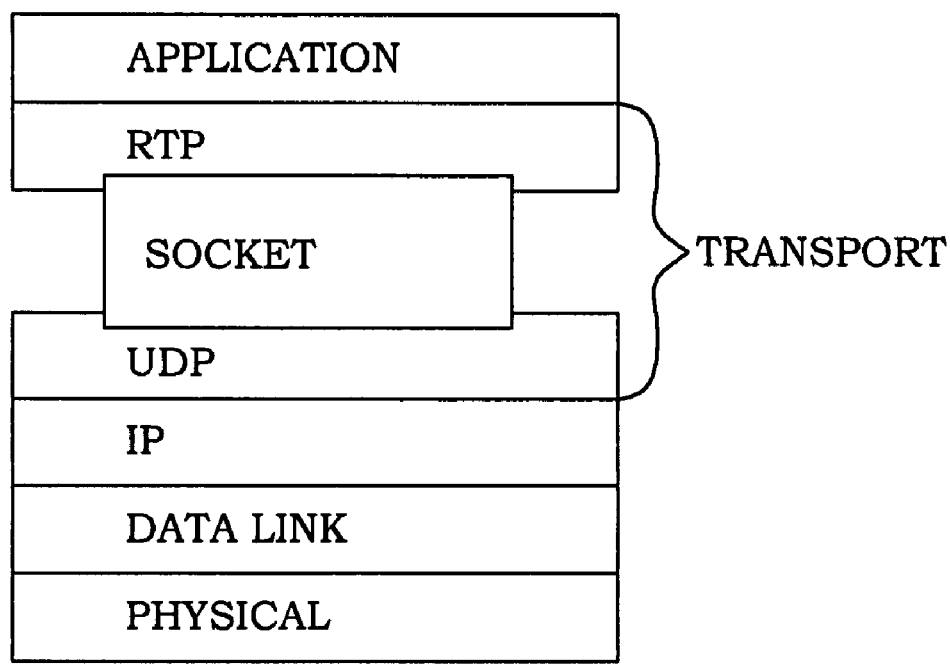
FIG. 3a illustrates communication of RTP packets in an ISO-OSI network layer model.

FIG. 3a illustrates the RTP protocol within the ISO-OSI layer reference model starting from the top with the application layer, in which the voice data is encoded. The encoded voice data is encapsulated in RTP headers and trailers to create RTP packets which are passed to the UDP-socket. UDP is a connectionless protocol, so that it is unnecessary to establish a connection beforehand. The transport layer makes use of mechanisms located on the Internet protocol layer which, in turn, is based on the data link layer and the physical layer.

Figure 3B:
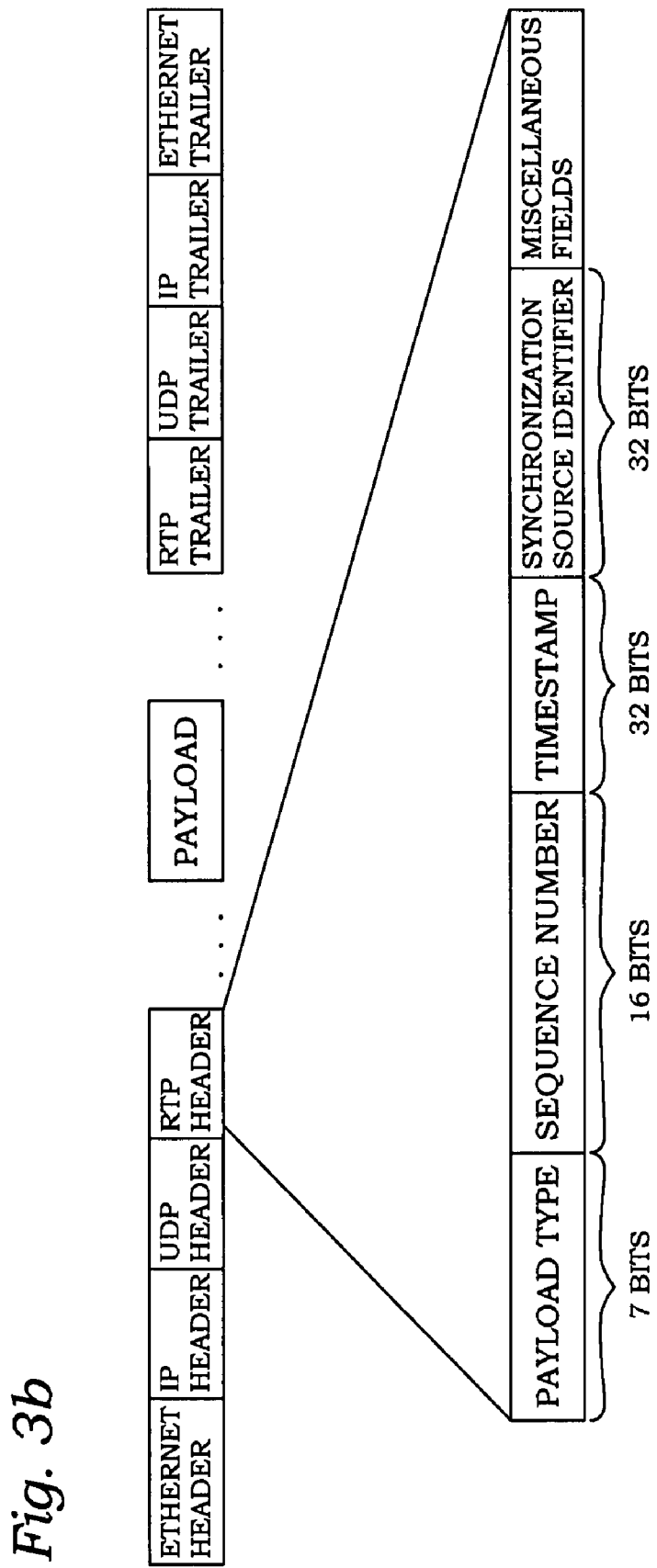
FIG. 3b illustrates RTP-payload encapsulated in different protocol headers and trailers.

FIG. 3b illustrates encapsulation performed by the different protocols according to the ISO-OSI reference model. The payload is encapsulated by the real time protocol, which is encapsulated by the user datagram protocol, which, in turn, is encapsulated by the Internet Protocol and on the datalink layer by the Ethernet protocol. The RTP header is shown in more detail and has a 7-bit payload-type field. For example, payload-type number 0 refers to PCM data, sampled at a sampling rate of 8 kHz. The payload-type field is followed by a 16-bit sequence number field. The sequence number increments by one for each RTP packet sent, and may be used by the receiver to detect packet loss and to restore packet sequence. For example, if the receiver side of the application receives a stream of RTP packets with a gap between sequence numbers 86 and 89, then the receiver knows that packets 87 and 88 are missing. The receiver can then attempt to conceal the lost data.

The timestamp field is 32 bits long. It reflects the sampling instant of the first byte in the RTP data packet. A receiver can use timestamps in order to remove packet jitter introduced in the network and to provide synchronous playout at the receiver. The timestamp is derived from a sampling clock at the sender. As an example, for audio the timestamp clock increments by one for each sampling period. A 32-bit synchronization source identifier field 32 is provided which identifies the source of an RTP stream. Typically, each stream in an RTP session has a distinct SSRC. The SSRC is not the IP address of the sender, but instead is a number that the source assigns randomly when the new stream is started. The probability that two streams get assigned the same SSRC is very small. Should this happen, the two sources pick a new SSRC value.

FIG. 4a illustrates a cascaded way of transmitting data indicating a threshold breach from a monitor subagent 44.2 to a monitor agent 46, and from the monitor agent 46 to the network node manager 47. After the VoIP-call has been set up between the analog phone 41.1 and the analog phone 41.4, the monitor subagent 44.2 is triggered by the softswitch 43 to sniff incoming UDP packets carrying RTP/RTCP data. This triggering obviates the need for the broadcast domain to be sniffed in the absence of RTP/RTCP data packets. In the example, the monitor subagent 44.2 detects that more than 90% of ingress (incoming) packets have been lost. To perform a root cause analysis, the monitor subagent 44.2 sends parameters of interest, such as source of data packets, destination of the data packets, call id, connection id and sender SSRC id to the monitor agent 46. By means of the command "snmpnotify", the monitor agent 46 sends an SNMP-trap to the network node manager 47. The trap contains data such as the IP address of the receiver, the IP address of the sender, a measured packet-loss value, a call id, a connection id, a sender SSRC id and a monitor subagent id. In the network node manager 47, the information contained in the trap is converted into an event which is consumed by the event subsystem 50 of the network node manager 47. The event is also consumed by the path analysis subsystem 49 of the network node manager 47. The path analysis subsystem 49 asks the resident monitor subagent 44.2 to perform a root cause analysis, whereby the subagent's id is in the received event. The monitor subagent 44.2 does a trace route analysis and sends the trace route data back to the path analysis subsystem 49.

On the basis of the trace route analysis, the root cause analysis subsystem 51 determines faulty interfaces which are responsible for the packet loss. To this end, the interfaces on the path are identified and it is asked via the command snmpCollect for the variables "InterfaceInOctets", "InterfaceOutOctets", "InterfaceErrorOctets" stored in the MIBs of the individual network components of the actual path.

Figure 4B:
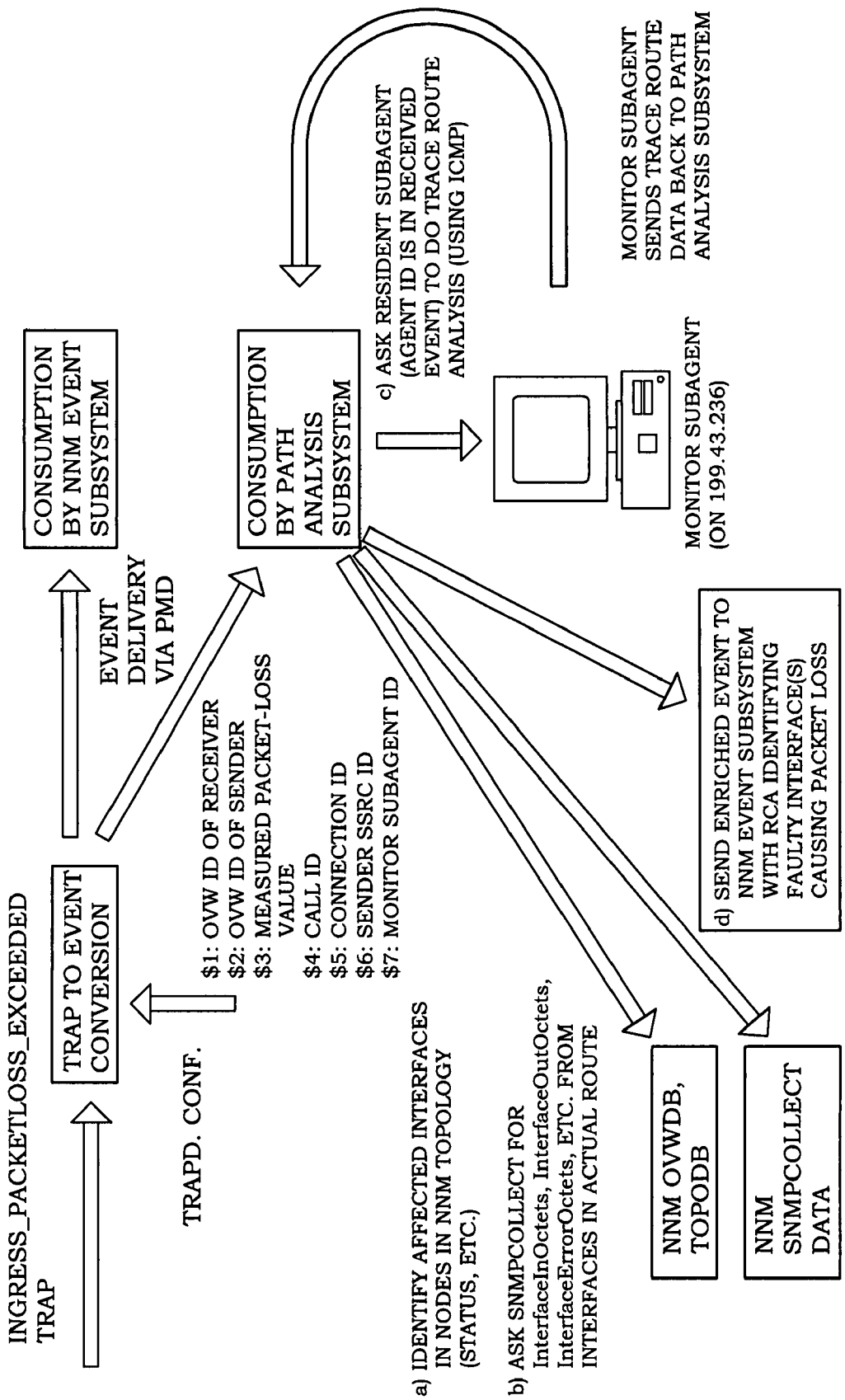
FIG. 4b illustrates a root cause analysis performed by a network node manager in response to the detection of the threshold breach, according to embodiments of the invention.

FIG. 4b shows in more detail processing of a trap indicating "INGRESS_PACKETLOSS_EXCEEDED". The incoming trap is first converted into an event by means of a configuration file "trapd.conf" that specifies how to translate SNMP traps/notifications into NNM events that are consumed within NNM subsystems, such as the event subsystem 50 and the path analysis subsystem 49. It is necessary to translate the SNMP traps to events since the NNM components that will ultimately process them for the root cause analysis, delivery to billing, etc. all recognize only such events. Thus, when an SNMP trap/notification arrives from the monitor agent 46 at network node manager 47, it needs first to be translated into an event that will contain all the parameters borne by the trap. The events are then delivered via pmd, which is a post master daemon that delivers these events to appropriate receivers. Each receiver registers with pmd to be delivered events of a particular "ID". It is needed to specify corresponding event IDs in trapd.conf when specifying the traps monitor agents will generate.

Once the event translated from INGRESS_PACKETLOSS_EXCEEDED trap is received by the path analysis subsystem 49, it does the following things:

At a) it looks up NNM topology database 52 to get a handle of the node object corresponding to the source and destination IP addresses. Once the node objects are determined, using their ID (Id of receiver/sender), a dump of the network path (layer-2/layer-3) between the source and the destination is obtained. This yields all the participating network nodes (switches, routers, etc.) in that path that carry the traffic between the endpoints. Now the path analysis subsystem 49 walks through each network node and retrieves the associated interfaces that are actually carrying the traffic. An operational/administrative status of the interfaces is also available at this time based on status last known by NNM 47.

At b), if one or more interfaces are found to be operationally or administratively "down", the root cause is determined as status 'down', interfaces [ifID][ifID] . . . " and then an enriched event is generated based upon the root cause and propagated to the event subsystem 50 for correlation and reporting. If this is not the case, an NNM snmpCollect component is consulted to assess the traffic performance of the interfaces concerned. If it is known that none of the interfaces are "down" but packet loss is still experienced nevertheless, it may be that packets are dropped at the interfaces due to congestion or error. Or it could be that the network path has changed dynamically to a more "lossy" or "down" path since network node manager 47 last knew the path between the endpoints. Interface performance data returned by snmpCollect will help assess whether the interfaces are performing poorly leading to the loss or not. It may be noted that snmpCollect collects the performance data from nodes via SNMP in an asynchronous manner, to be ready with the data when requested by path analysis. Therefore it is essential that snmpCollect is able to maintain stable SNMP communication with the "Management IP address" of the nodes inspite of the nodes' individual interfaces being disruptive. If it is assessed that interfaces are faulty, the root cause is determined as "faulty interface(s) [ifID][ifID] . . . " and an enriched event is generated based upon the root cause and propagated to the event subsystem 50 for correlation and reporting.

At c), the path analysis subsystem 49 then instructs the observing monitor subagent 44.2 to attempt an ICMP-based trace-route of the affected path. The trace-route is done by the sub-agent because it is able to see the same layer-3 path as seen by the endpoint experiencing the loss. This may or may not be successful because the path may already be sufficiently lossy or down not to be able to accommodate additional trace-route traffic. If trace-route is successful, path analysis is able to compare the path with the path last known by the network node manager 47. If a new path is indicated, path analysis again resolves the nodes in the path, their interfaces, their status and if necessary consults snmpCollect to assess their health. If faulty interfaces are identified in the new path, root cause is determined as "path changed, faulty interface(s) [ifID][ifID] . . . in new path", path analysis sends an enriched event to the event subsystem with root cause analysis identifying faulty interface(s) causing packet loss.

At d), else the path analysis subsystem 49 now revisits the switches and routers in the last known path between the endpoints. Using SNMP on only the management IP addresses of the devices, it attempts to determine if the path has changed by analyzing neighbors reported by the devices. For example, with regard to a router, if the "next hop" IP address to route the destination has changed this is an indication the layer-3 path has changed. For a switch, a combined analysis of its 802.1d forwarding table and any neighbor advertisement table such as CISCO CDP or EXTREME EDP may yield any layer-2 path that has changed. If the path is changed, a new discovery and complete fault monitoring is scheduled for NNM, and the root cause for now is determined as "path changed, unknown interface behavior in new path".

At e), finally, an enriched event is generated on the basis of the root cause and propagated to the event subsystem for correlation and reporting.

The "enriched event" contains the result of a root cause analysis based on input parameters carried by the original input event(s) and further analysis done by various subsystems acting on the input parameters. This event may also have some parameters canonicalized within the network node manager domain. In the example of ingress packet loss provided, after the path-analysis subsystem consumes the incoming event, it calls on the help of various other subsystems as follows—network node manager ovwdb/topodb to identify the network interfaces concerned, snmpCollect to determine interface health, comparing trace-route data as reported by the subagent against the last stored topology to arrive at the root cause. In the process of resolving affected interfaces, it also canonicalizes the endpoints by replacing Source and Destination IP Addresses in the incoming event by node object IDs held in the network node management topology database 52.

Figure 4C:
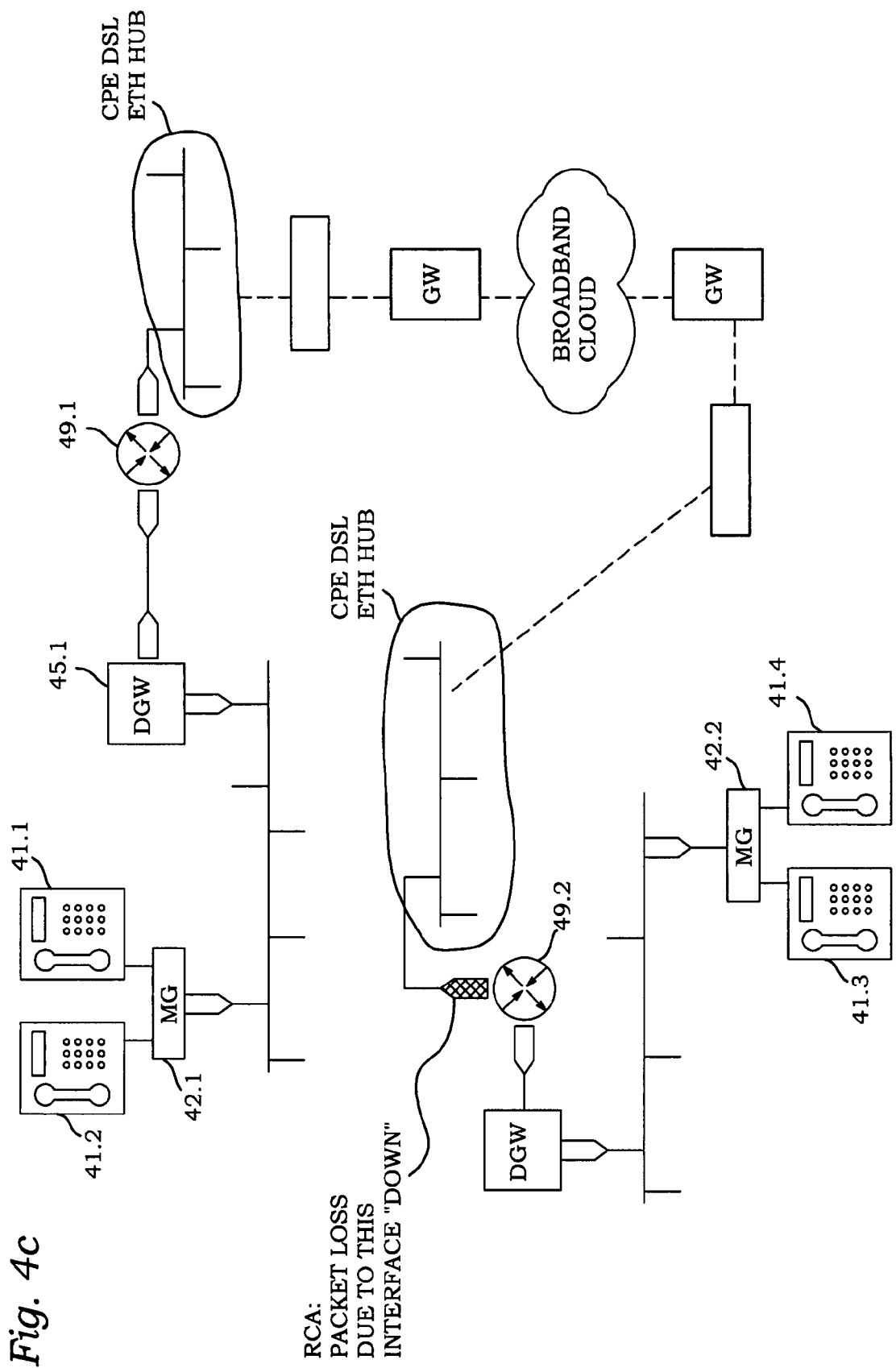
FIG. 4c illustrates a path detected by a path analysis subsystem, via which VoIP-data is transmitted, according to embodiments of the invention.

FIG. 4c shows the result of the root cause analysis explained by means of FIGS. 4a and b. The root cause analysis subsystem 51 detected that one interface of router 49.2 is down. Therefore, the root cause analysis subsystem 51 indicates that a threshold of packet loss has been exceeded.

Figure 5A:
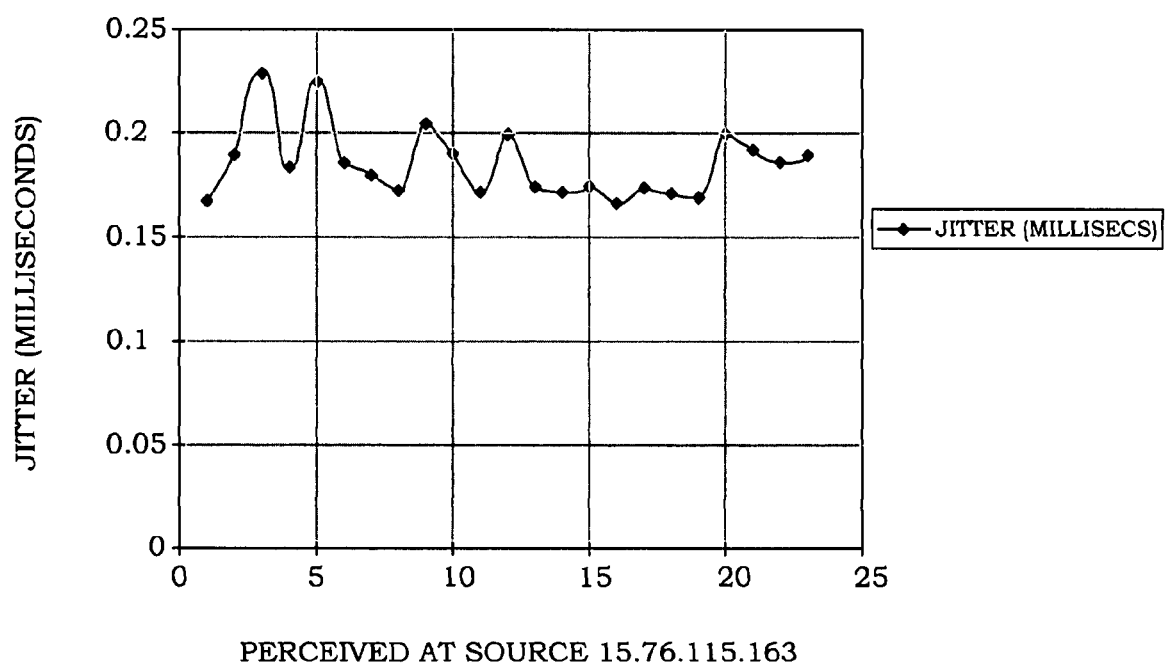
FIG. 5a is a graphical report plotting jitter as perceived at a point in the network, according to embodiments of the invention.

FIG. 5a shows a sample Graphical report (all reports are on measurements taken at real-time for two VoIP peers exchanging audio packets using G.723 8 kHz encoding). The diagram shows jitter as perceived at a source having IP-address 15.76.115.163.

Figure 5B:
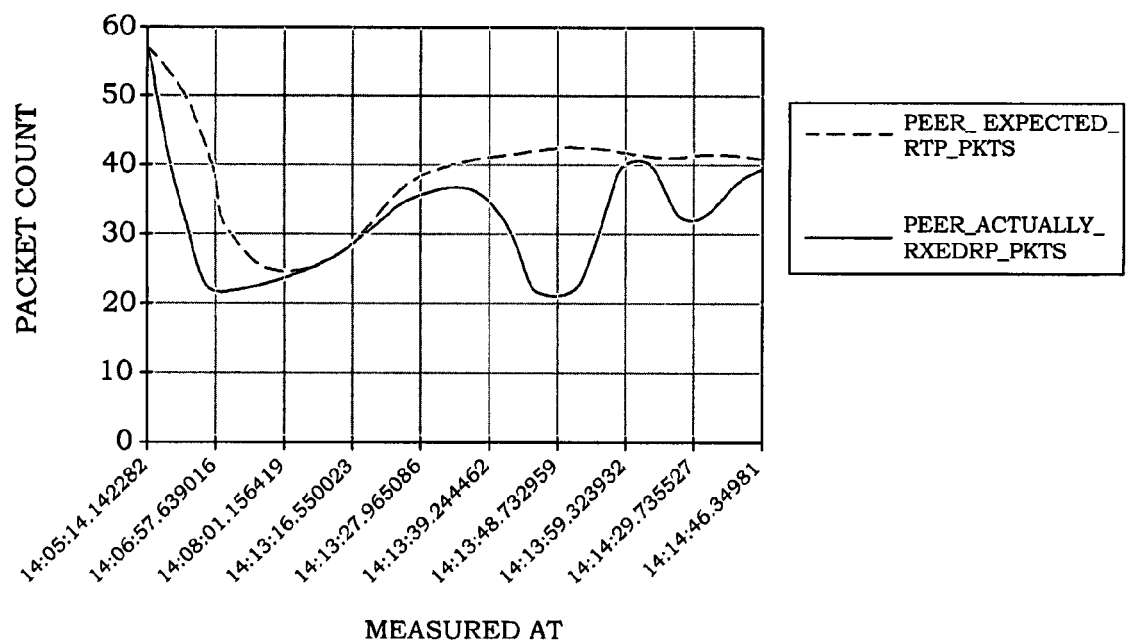
FIG. 5b is a graphical report that plots RTP packets expected and RTP packets actually arrived at indicated points of time, according to embodiments of the invention.

FIG. 5b shows another sample Graphical report on measurements taken at real-time for two VoIP peers exchanging audio packets using G.723 8 KHz encoding. The diagram shows a graphical report that plots RTP packets expected (dotted line) and RTP packets actually arrived at indicated timestamps. Values are computed at destination 15.76.115.163. It may be seen that at some points of time, the number of RTP packets actually received is identical to the number of RTP packets expected, whereas at other points of time, the number of RTP packets which actually arrived at destination 15.76.115.163 is below the expected number of RTP packets.

Figure 5C:
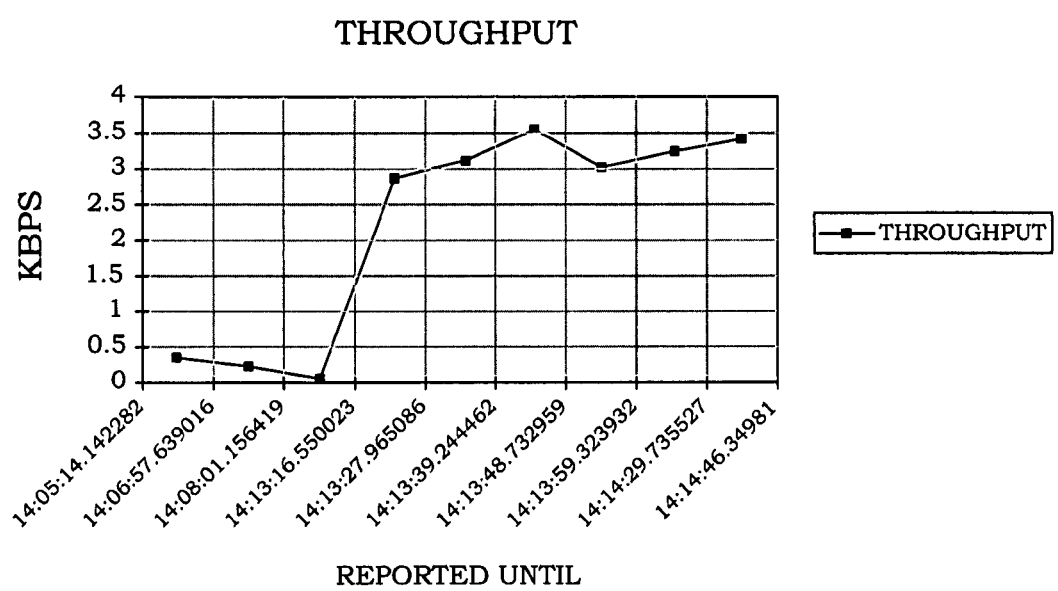
FIG. 5c is a graphical report that plots throughput sampled at indicated points of time, according to embodiments of the invention.

FIG. 5c shows a sample graphical report that plots throughput sampled at indicated timestamps. Values are for RTP packets leaving 15.76.114.155 and include RTP, UDP, IP and Ethernet header overheads. It may be seen that the throughput at 15.76.114.155 is below 0.5 kilobits per second, whereas at the point of time 14:13:16.550023 the throughput is drastically increased to more than 3 kilobits per second.

Figure 6:
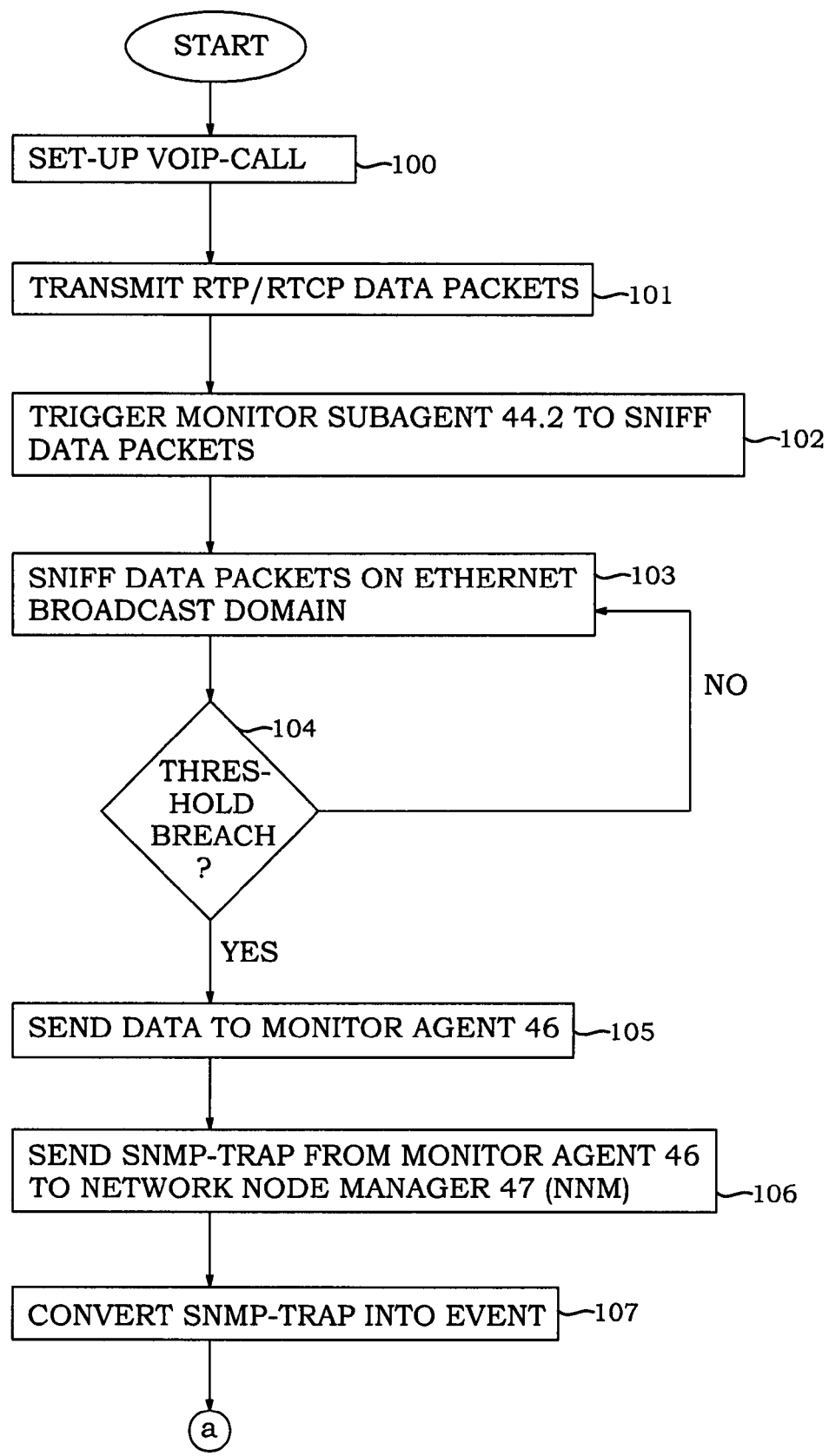
FIG. 6 is a diagram indicating the course of action of a sniffing-based monitoring of a packet-switched network, according to embodiments of the invention.
Figure 6:
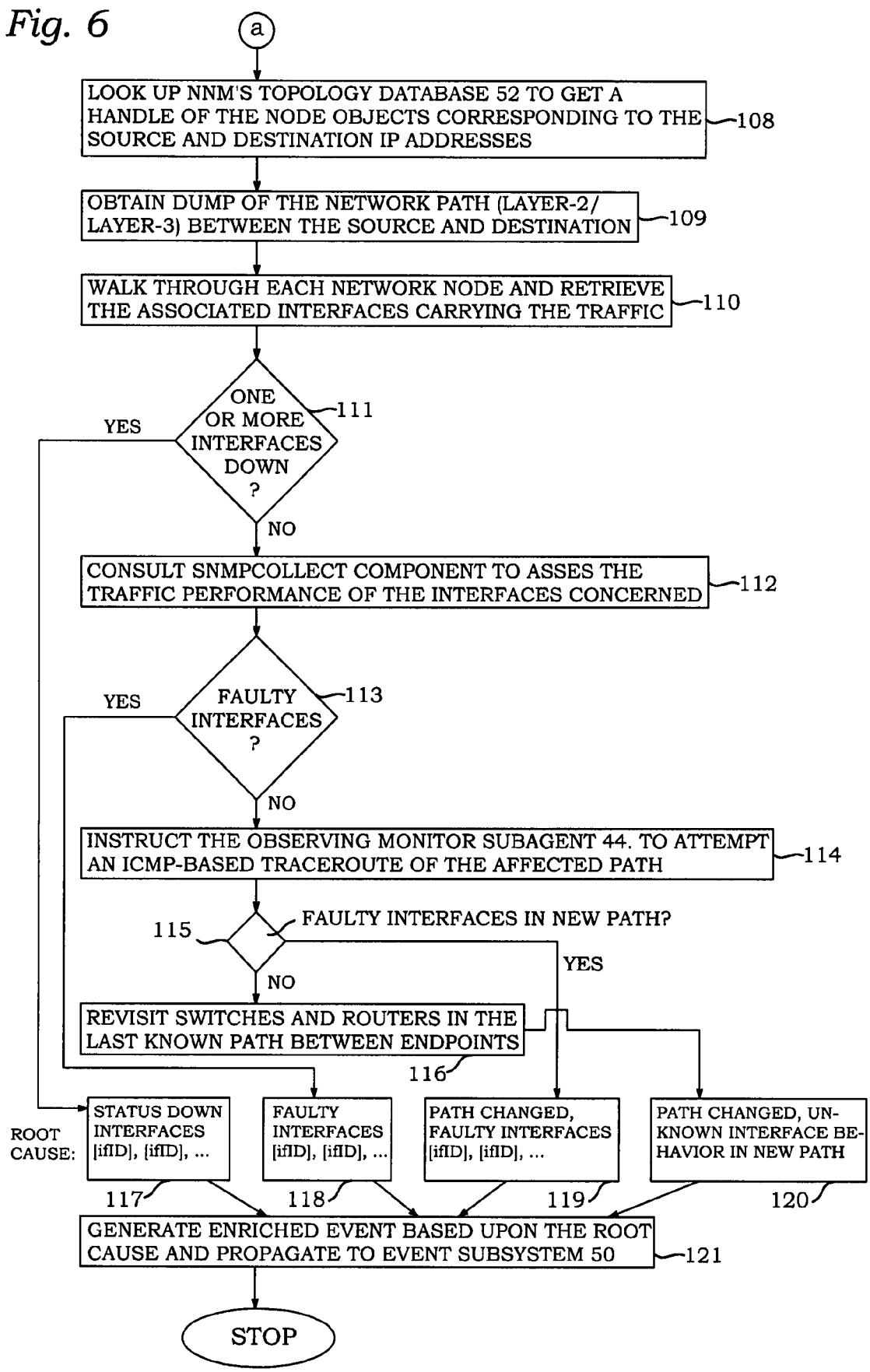

FIG. 6 shows a flowchart diagram indicating the course of action of a sniffing-based network monitoring method. At 100, a VoIP-call is set-up between two peer VoIP participants 41.1, 41.2. After the call has been set-up, RTP/RTCP data packets are transmitted at 101. At 102, a softswitch 43 triggers the monitor subagent 44.2 to sniff UDP data packets containing RTP/RTCP data. At 103, the monitor subagent 44.2 resident on the same Ethernet broadcast domain and starts sniffing the data packets on the Ethernet broadcast domain, on which the media gateway 42.2 which is to be monitored is located. Alternatively, the monitor subagent is resident, together with the software establishing the call connection, on one of the VoIP peers 41.1, 41.2. At 104, it is ascertained whether a threshold breach is detected. If this is answered in the negative, it proceeds to 103. If positive, i.e. if a threshold breach is detected, the monitor subagent 44.2, which detects the threshold breach, sends the data containing data reporting about the breach to the monitor agent 46 at 105. At 106, the monitor agent 46, in turn, sends an SNMP-trap to the network node manager 47. There, the SNMP-trap is converted into an event at 107. At 108, a look-up is performed in the topology database 52 to get a handle of the node objects corresponding to the source and destination IP addresses of the packet on the basis of which the event was created. At 109, by means of the topology database 52, a dump of the network path, in terms of layer-2 and layer-3 network nodes, between the source and destination is obtained. This yields all the participating network nodes that carry the traffic between the endpoints in that path. At 110, the path analysis subsystem 49 walks through each network node and retrieves the associated interfaces that are actually carrying the traffic. An operational/administrative status of the interfaces is also available at this time based on status last known NNM 47. At 111, it is ascertained whether one or more interfaces are found to be operationally or administratively "down". If this is answered in the affirmative, then at 117, the root cause is determined as "status down, interfaces [ifID], [ifID], . . . ". At 121, an enriched event based upon the root cause is generated and propagated to the event subsystem 50. If, however, it is ascertained at 111, that no interfaces are down, then, at 112, the path analysis subsystem 49 consults snmpCollect component to assess the traffic performance of the concerned interfaces. Since, at 112, it is clear that none of the interfaces is down, it may be that packets are dropped at the interfaces due to congestion or error. Or it could be that the network path has changed dynamically to a more "lossy" or "down" path since NNM 47 last knew the path between the endpoints. Interface performance returned by snmpCollect will help assess whether the interfaces perform poorly leading to the loss or not. It may be noted that snmpCollect collects the performance data from nodes via SNMP in an asynchronous manner, to be ready with the data when requested by path analysis. Therefore, it is important that snmpCollect is able to maintain stable SNMP communication with the management IP address of the nodes inspite of the nodes' individual interfaces being disruptive. If, at 113, it is determined that interfaces are faulty, the root cause is determined at 118 as "faulty interfaces [ifID], [ifID], . . . " and at 121 an enriched event is generated based upon the root cause and is propagated to the event subsystem 50. If this is not the case, the path analysis subsystem 49 instructs the observing monitor subagent to attempt an ICMP-based trace-route of the affected path at 114. The trace-route is done by the monitor subagent 44.2 because it is able to see the same layer-3 path as seen by the endpoint experiencing the loss. This may or may not be successful because the path may already be sufficiently lossy or down not to be able to accommodate additional trace-route traffic. If trace-route is successful, path analysis is able to compare the path with the path last known by NNM 47. If a new path is indicated, path analysis again resolves the nodes in the path, their interfaces, their status and if necessary consults snmpCollect to assess their health. At 115, it is ascertained whether faulty interfaces are identified in the new path. If this is the case, root cause is determined as "path changed, faulty interfaces [ifID], [ifID], . . . " at 119 and it is proceeded to 121. If otherwise, at 166, path analysis subsystem 49 revisits the switches and routers in the last known path between the endpoints. Using SNMP on only the management IP addresses of the network devices, the path analysis subsystem 49 attempts to determine if the path has changed by analyzing neighbors reported by the devices. To take a router for example, if the "next hop" IP address to route the destination has changed, this is an indication that the layer-3 path has changed. For a switch, a combined analysis of its 802.1d forwarding table and any neighbor advertisement table such as Cisco CDP or Extreme EDP may yield any layer-2 path that has changed. If the path is changed, a new discovery and complete fault monitoring is scheduled for NNM 47, and the root cause for now is determined as "path changed, unknown interface behavior in new path" at 120. Then, the system proceeds to 121.

Figure 7:
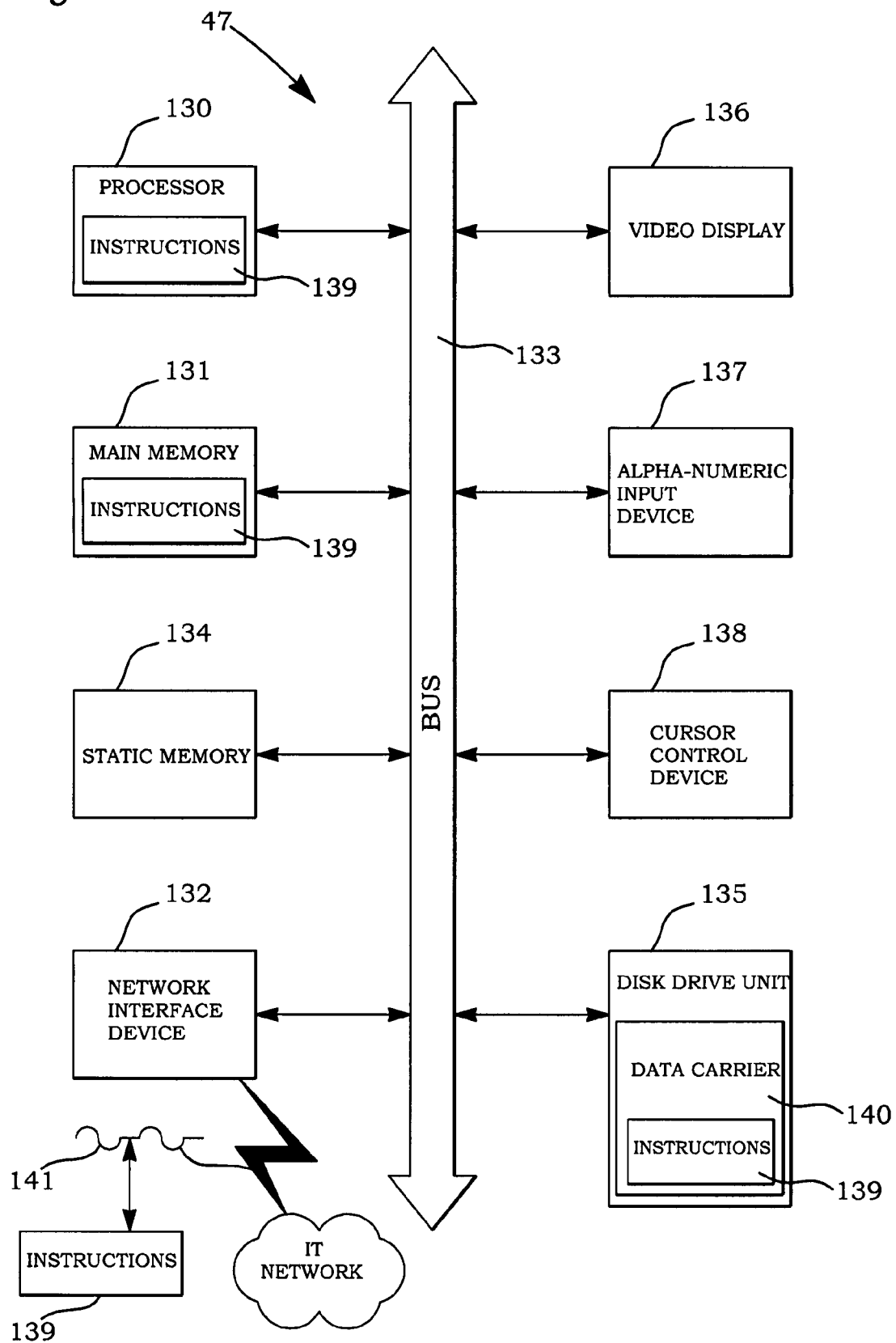
FIG. 7 is a diagrammatic representation of an embodiment of a network node manager computer station, according to embodiments of the invention.

FIG. 7 is a diagrammatic representation of a computer system which provides the functionality of the network node manager 47 of FIG. 2, and is therefore denoted as "network node manager computer system 47". Within the network node computer system 47 a set of instructions, for causing the computer system to perform any of the methodologies discussed herein, may be executed. The network node manager computer system 47 includes a processor 130, a main memory 131 and a network interface device 132, which communicate with each other via a bus 133. Optionally, it may further include a static memory 134 and a disk drive unit 135. A video display 136, an alpha-numeric input device 137 and a cursor control device 138 may form a network node manager user interface. The network interface device 132 connects the network node manager computer system 47 to the managed packet-switched IT network. A set of instructions (i.e. software) 139 embodying any one, or all, of the methodologies described above, resides completely, or at least partially, in or on a non-transitory machine-readable medium, e.g. the main memory 131 and/or the processor 130. A machine-readable medium on which the software 139 resides may also be a data carrier 140 (e.g. a non-removable magnetic hard disk or an optical or magnetic removable disk) which is part of the disk drive unit 135. The software 139 may further be transmitted or received as a propagated signal 141 via the Internet and the packet-switched through the network interface device 132.

Thus, the embodiments of the invention described above allow for an sniffing-based network monitoring.

All publications and existing systems mentioned in this specification are herein incorporated by reference.

Although certain methods and products constructed in accordance with the teachings of the invention have been described herein, the scope of the coverage of this patent is not limited thereto. On the contrary, this patent covers all embodiments of the teachings of the invention fairly falling within the scope of the appended claims either literally or under the doctrine of equivalents.

The invention claimed is:

1. A method of monitoring a packet-switched network via which real-time data is transmitted, the method comprising:

in response to signaling messages issued by a media gateway controller, non-promiscuously sniffing only data packets of a Voice over Internet Protocol (VoIP) phone call, said data packets containing real-time data, said non-promiscuous sniffing conducted by a monitor subagent to monitor a quality-of-service parameter, said monitor subagent accepting commands from a softswitch to start and stop the non-promiscuous sniffing such that unnecessary non-promiscuous sniffing in an absence of Real-Time Transport Protocol (RTP) traffic does not occur, wherein the sniffing is with regard to at least one of RTP packets and RTP Control Packets (RTCP), wherein said real-time data is encapsulated with a Real-Time Transport Protocol (RTP) header and a Real-Time Transport Protocol (RTP) trailer and said Real-Time Transport Protocol (RTP) header and said Real-Time Transport Protocol (RTP) trailer are encapsulated with a user datagram protocol (UDP) header and a user datagram protocol (UDP) trailer;

notifying, in response to a threshold breach of the quality-of-service parameter detected via said non-promiscuous sniffing, a monitor agent about the threshold breach;

forwarding to the media gateway controller the threshold breach of the quality-of-service parameter, the media gateway controller then adapting to changed network conditions indicated by the quality-of-service parameter by directing media entities to renegotiate bandwidth communication for a higher bandwidth communication for the VoIP phone call;

notifying, by the monitor agent, a network node manager about the threshold breach, wherein the network node manager is a hardware entity comprising computer code stored thereon; and determining, by the network node manager via responsive initiation and performance of a path analysis, a root cause of a fault of the threshold breach.

2. The method of claim 1, wherein the determining of the root cause of the fault enables Service Level Agreement (SLA) management.

3. The method of claim 1, further comprising reporting the root cause to a user.

4. The method of claim 1, wherein the quality-of-service parameter comprises one of egress delay, ingress delay, jitter, roundtrip delay, packet loss, throughput, instantaneous signal loss, and accumulated content loss.

5. The method of claim 1, wherein notifying a network node manager comprises sending a trap to the network node manager.

6. The method of claim 5, wherein sending a trap comprises sending a simple network management protocol (SNMP)-trap.

7. The method of claim 1, wherein the path analysis comprises examining interfaces of network devices lying on a path.

8. The method of claim 1, wherein the monitor subagent cooperates with determining the root cause of the fault.

9. The method of claim 1, wherein the network node manager comprises a path analysis subsystem and a root cause analysis subsystem.

10. The method of claim 1, wherein an alert is triggered in response to breaching a threshold.

11. The method of claim 1, wherein a "what-if" analysis is performed based on performance data stored in a data warehouse.

12. A system for monitoring a packet-switched network via which real-time data is transmitted, the system comprising:

one or more monitor subagents configured to:

in response to signaling messages issued by a media gateway controller, non-promiscuously sniff only data packets of a Voice over Internet Protocol (VoIP) phone call, said data packets containing real-time data to monitor a quality-of-service parameter, said monitor subagent accepting commands from a softswitch to start and stop the non-promiscuous sniffing such that unnecessary non-promiscuous sniffing in an absence of Real-Time Transport Protocol (RTP) traffic does not occur, wherein the sniffing is with regard to at least one of (RTP) RTP packets and RTP control packets (RTCP), wherein said real-time data is encapsulated with a Real-Time Transport Protocol (RTP) header and a Real-Time Transport Protocol (RTP) trailer and said Real-Time Transport Protocol (RTP) header and said Real-Time Transport Protocol (RTP) trailer are encapsulated with a user datagram protocol (UDP) header and a user datagram protocol (UDP) trailer;

notify, in response to a threshold breach of the quality-of-service parameter detected via said non-promiscuous sniffing, a monitor agent about the threshold breach;

forward to the media gateway controller the threshold breach of the quality-of-service parameter, the media gateway controller then adapting to changed network conditions indicated by the quality-of-service parameter by directing media entities to renegotiate bandwidth communication for a higher bandwidth communication for the VoIP phone call; and the monitor agent configured to notify a network node manager about the threshold breach, wherein the network node manager is a hardware entity comprising computer code stored thereon that, when executed by a processor, causes the network node manager to responsively initiate and perform a path analysis to determine a root cause of a fault of the threshold breach.

13. The system of claim 12, wherein the network node manager is configured to determine the root cause of the fault by performing a path analysis to find out a path over which real-time data is transmitted.

14. A non-transitory computer-readable storage medium having stored thereon, computer-executable instructions that, when executed by a system, causes the system to perform a method comprising:

in response to signaling messages issued by a media gateway controller, non-promiscuously sniffing only data packets of a Voice over Internet Protocol (VoIP) phone call, said data packets containing real-time data, said non-promiscuous sniffing conducted by a monitor subagent to monitor a quality-of-service parameter, said monitor subagent accepting commands from a softswitch to start and stop the non-promiscuous sniffing such that unnecessary non-promiscuous sniffing in an absence of Real-Time Transport Protocol (RTP) traffic does not occur, wherein the sniffing is with regard to at least one of RTP packets and RTP control packets (RTCP), wherein said real-time data is encapsulated with a Real-Time Transport Protocol (RTP) header and a Real-Time Transport Protocol (RTP) trailer and said Real-Time Transport Protocol (RTP) header and said Real-Time Transport Protocol (RTP) trailer are encapsulated with a user datagram protocol (UDP) header and a user datagram protocol (UDP) trailer;

notifying, in response to a threshold breach of the quality-of-service parameter detected via said non-promiscuous sniffing, a monitor agent about the threshold breach;

forwarding to the media gateway controller the threshold breach of the quality-of-service parameter, the media gateway controller then adapting to changed network conditions indicated by the quality-of-service parameter by directing media entities to renegotiate bandwidth communication for a higher bandwidth communication for the VoIP phone call;

notifying, by the monitor agent, a network node manager about the threshold breach, wherein the network node manager is a hardware entity; and determining, by the network node manager via responsive initiation and performance of a path analysis, a root cause of a fault of the threshold breach.

15. The computer-readable storage medium of claim 14, wherein determining the root cause of the fault comprises performing a path analysis to find out a path over which real-time data is transmitted.

* * * * *

UNITED STATES PATENT AND TRADEMARK OFFICE
CERTIFICATE OF CORRECTION

| | | |
|---|---|---|
| PATENT NO. | : 7,936,694 B2 | |
| APPLICATION NO. | : 11/729864 | |
| DATED | : May 3, 2011 | |
| INVENTOR(S) | : Jonmejoy Das Choudhury | |

It is certified that error appears in the above-identified patent and that said Letters Patent is hereby corrected as shown below:

In column 18, line 52, in Claim 12, after "of" delete "(RTP)".

Signed and Sealed this
Thirteenth Day of September, 2011

David J. Kappos
*Director of the United States Patent and Trademark Office*